(12) United States Patent
Xu et al.

(10) Patent No.: US 11,778,681 B2
(45) Date of Patent: Oct. 3, 2023

(54) DATA TRANSMISSION METHOD AND APPARATUS

(71) Applicant: HUAWEI TECHNOLOGIES CO., LTD., Shenzhen (CN)

(72) Inventors: Xiaoying Xu, Shanghai (CN); Xing Liu, Shenzhen (CN); Chong Lou, Shanghai (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 74 days.

(21) Appl. No.: 17/142,204

(22) Filed: Jan. 5, 2021

(65) Prior Publication Data
US 2021/0127446 A1    Apr. 29, 2021

Related U.S. Application Data

(63) Continuation of application No. PCT/CN2019/089775, filed on Jun. 3, 2019.

(30) Foreign Application Priority Data

Jul. 6, 2018 (CN) .......................... 201810738240.X

(51) Int. Cl.
*H04W 76/19* (2018.01)
*H04W 72/0453* (2023.01)
(Continued)

(52) U.S. Cl.
CPC ........... *H04W 76/19* (2018.02); *H04L 1/1819* (2013.01); *H04W 72/0453* (2013.01);
(Continued)

(58) Field of Classification Search
None
See application file for complete search history.

(56) References Cited

U.S. PATENT DOCUMENTS

2005/0094625 A1* 5/2005 Bouat ................... H04W 84/08
370/401
2010/0260136 A1* 10/2010 Fan .................... H04W 72/0453
370/330
(Continued)

FOREIGN PATENT DOCUMENTS

CN          104144524 A       11/2014
CN          106105366 A       11/2016
(Continued)

OTHER PUBLICATIONS

Samsung, Corrections on PRACH procedure. 3GPP TSG RAN WG1 Meeting AH 1801, Vancouver, Canada, Jan. 22-26, 2018, R1-1800990, 9 pages.
(Continued)

*Primary Examiner* — The Hy Nguyen

(57) ABSTRACT

Various embodiments provides a data transmission method and an apparatus. In those embodiments, at least two frequency domain resources are configured for transmission of a connection resumption request, a connection establishment request, or a connection reestablishment request, and the connection resumption request, the connection establishment request, or the connection reestablishment request is sent by using the at least two frequency domain resources.

16 Claims, 12 Drawing Sheets

(51) Int. Cl.
  *H04W 76/30* (2018.01)
  *H04L 1/1812* (2023.01)
  *H04W 74/00* (2009.01)
  *H04W 74/08* (2009.01)

(52) U.S. Cl.
  CPC ..... *H04W 74/006* (2013.01); *H04W 74/0833* (2013.01); *H04W 76/30* (2018.02)

(56) References Cited

U.S. PATENT DOCUMENTS

| | | | | |
|---|---|---|---|---|
| 2012/0218987 | A1* | 8/2012 | Zhao | H04L 27/2657 370/350 |
| 2012/0300714 | A1* | 11/2012 | Ng | H04W 74/0833 370/329 |
| 2013/0163525 | A1* | 6/2013 | Moon | H04W 72/042 370/329 |
| 2013/0195071 | A1 | 8/2013 | Ohta et al. | |
| 2015/0055604 | A1 | 2/2015 | Ohta et al. | |
| 2015/0341915 | A1* | 11/2015 | Lyu | H04W 72/04 370/277 |
| 2017/0134935 | A1* | 5/2017 | Wei | H04L 1/08 |
| 2018/0027566 | A1* | 1/2018 | Ohta | H04W 76/14 370/328 |
| 2018/0368188 | A1* | 12/2018 | Aiba | H04L 5/00 |
| 2019/0306861 | A1* | 10/2019 | Li | H04W 72/0453 |
| 2020/0059968 | A1* | 2/2020 | Christoffersson | H04W 76/27 |
| 2020/0107375 | A1* | 4/2020 | Lee | H04L 1/1896 |
| 2021/0045181 | A1* | 2/2021 | Li | H04J 11/00 |
| 2021/0144723 | A1* | 5/2021 | Takahashi | H04L 5/0053 |
| 2021/0176797 | A1* | 6/2021 | Kang | H04W 74/0833 |
| 2021/0266981 | A1* | 8/2021 | Wei | H04W 40/22 |
| 2022/0151011 | A1* | 5/2022 | Chang | H04W 76/18 |

FOREIGN PATENT DOCUMENTS

| | | |
|---|---|---|
| CN | 106788943 A | 5/2017 |
| EP | 3547774 A1 | 10/2019 |
| WO | 2017131479 A1 | 8/2017 |
| WO | 2017133550 A1 | 8/2017 |
| WO | 2017133678 A1 | 8/2017 |
| WO | 2017166255 A1 | 10/2017 |
| WO | 2018057120 A1 | 3/2018 |
| WO | 2018121435 A1 | 7/2018 |

OTHER PUBLICATIONS

European Search Report in European Application No. 19830861.1 dated Jul. 30, 2021, 13 pages.
Office Action for Chinese Application No. 201810738240 dated Oct. 10, 2022, 54 pages.

* cited by examiner

DATA TRANSMISSION METHOD AND APPARATUS

CROSS-REFERENCE TO RELATED APPLICATIONS

This application is a continuation of International Application No. PCT/CN2019/089775, filed on Jun. 3, 2019, which claims priority to Chinese Patent Application No. 201810738240.X, filed on Jul. 6, 2018, The aforementioned applications are hereby incorporated by reference in their entireties.

TECHNICAL FIELD

This disclosure relates to the field of communication technologies, and in particular, to a data transmission method and an apparatus.

BACKGROUND

In a wireless communications system, various types of data are transmitted between a terminal and a network device in uplink and downlink by using radio bearers (RB) at various protocol layers stipulated by the 3rd generation partnership project (t3GPP) organization. For example, control signaling is transmitted on a signaling radio bearer or service data is transmitted on a data radio bearer. The protocol layers may include a physical (PHY) layer, a media access control (MAC) layer, a radio link control (RLC) layer, a packet data convergence protocol (PDCP) layer, a radio resource control (RRC) layer, and the like.

Before the various types of data are transmitted between the terminal and the network device, the terminal establishes a connection to the network device through a random access procedure. The random access procedure mainly includes a 4-step message flow, which is shown in FIG. 1. Message 1: The terminal sends a random access preamble to the network device to initiate the random access procedure. Message 2: The network device sends a random access response (RAR) to the terminal, where the random access response indicates an uplink resource, a timing advance (timing advance, TA), a temporary cell radio network temporary identifier (temporary cell radio network temporary identifier, TC-RNTI) of the terminal, and the like. Message 3: The terminal sends an uplink message to the network device based on the random access response. Message 4: The network device sends a response message of the uplink message to the terminal. After the random access procedure is completed, the terminal may establish a connection to the network device. The terminal can send other uplink data to the network device based on the connection.

With development of the wireless communications system, higher requirements are imposed on reliability, and in the foregoing random access procedure, the requirements for high reliability imposed by evolution of the wireless communications system may not be ensured.

SUMMARY

Various embodiments provide a data transmission method and an apparatus.

According to a first aspect, one embodiment provides a data transmission method, including the following steps:

A terminal receives first information from a network device, where the first information includes information related to a first frequency domain resource and information related to a second frequency domain resource; the terminal determines the first frequency domain resource and the second frequency domain resource based on the first information, where the first information is carried in a connection release message, a broadcast message, physical random access channel configuration information, or a random access response; and the terminal sends uplink information by using the first frequency domain resource, and sends the uplink information by using the second frequency domain resource, where the uplink information is used to request connection resumption, connection establishment, or connection reestablishment.

According to the method provided in this embodiment, at least two frequency domain resources are configured for transmission of a connection resumption request, a connection establishment request, or a connection reestablishment request, and the connection resumption request, the connection establishment request, or the connection reestablishment request is sent by using the at least two frequency domain resources. In this case, reliability of the transmission of the connection resumption request, the connection establishment request, or the connection reestablishment request can be improved.

In some embodiments, the first frequency domain resource is different from the second frequency domain resource. The connection resumption request, the connection establishment request, or the connection reestablishment request is sent by using at least two resources different in frequency domain, so that frequency domain diversity can be obtained to resist frequency domain selective fading, thereby improving the reliability of the transmission of the connection resumption request, the connection establishment request, or the connection reestablishment request, and reducing a delay in connection resumption, connection establishment, or connection reestablishment.

In some embodiments, the first information is included in the physical random access channel configuration information, the information related to the first frequency domain resource and the information related to the second frequency domain resource is a physical random access channel configuration in the physical random access channel configuration information, and there is a correspondence between the physical random access channel configuration and the first frequency domain resource and the second frequency domain resource.

In some embodiments, the information related to the first frequency domain resource is information indicating the first frequency domain resource, and the information related to the second frequency domain resource is information indicating the second frequency domain resource. In some embodiments, the terminal determines the first frequency domain resource based on the information related to the first frequency domain resource, and determines the second frequency domain resource based on the information related to the second frequency domain resource.

In some embodiments, the information related to the first frequency domain resource is information indicating the first frequency domain resource, and the information related to the second frequency domain resource is information indicating to obtain the second frequency domain resource based on the first frequency domain resource and with reference to a predefined or configured rule. In some embodiments, the predefined or configured rule is a frequency hopping rule, an offset rule, or the like. In some embodiments, the terminal determines the first frequency domain resource based on the information related to the first frequency domain resource, and determines the second frequency domain resource based on the information related to the first frequency domain resource, the information related to the second frequency domain resource, and the predefined or configured rule. In this implementation, overheads of indicating two frequency domain resources can be reduced.

In some embodiments, the first information includes information about M frequency domain resources, where M is an integer greater than 2; and the terminal determines the first frequency domain resource and the second frequency domain resource based on the information about the M frequency domain resources. More frequency domain resources are allocated, so that a probability of a resource conflict can be reduced when the terminal sends the uplink information on a shared frequency domain resource.

In some embodiments, the terminal randomly determines the first frequency domain resource and the second frequency domain resource in the M frequency domain resources indicated by the information about the M frequency domain resources; the terminal determines, based on an identifier of the terminal, the first frequency domain resource and the second frequency domain resource in the M frequency domain resources indicated by the information about the M frequency domain resources; or the terminal determines, based on a cause for a connection request, the first frequency domain resource and the second frequency domain resource in the M frequency domain resources indicated by the information about the M frequency domain resources, where the connection request is a connection resumption request, a connection establishment request, or a connection reestablishment request.

In some embodiments, the terminal determines, based on a cause for a connection request, whether to send the uplink information by using the first frequency domain resource, and send the uplink information by using the second frequency domain resource, where the connection request is a connection resumption request, a connection establishment request, or a connection reestablishment request; or the terminal determines, based on a higher layer indication of the terminal or a higher layer request of the terminal, whether to send the uplink information by using the first frequency domain resource, and send the uplink information by using the second frequency domain resource. In the foregoing implementations, data of a high priority or a high service requirement may be transmitted by using two frequency domain resources, and data of a low priority or a low service requirement may be transmitted still by using one frequency domain resource. In this way, reliability of the data of a high priority or a high service requirement is ensured, and resource use efficiency is improved.

In some embodiments, the terminal obtains a physical random access channel configuration based on the physical random access channel configuration information, where the physical random access channel configuration is used to configure a time-frequency resource and a format of a random access preamble.

In some embodiments, the physical random access channel configuration corresponds to the first frequency domain resource and the second frequency domain resource; and the terminal determines the first frequency domain resource and the second frequency domain resource based on the physical random access channel configuration. In this implementation, the network may determine, based on a random access channel (random access channel, RACH) request, whether to allocate a plurality of frequency domain resources to the terminal, to avoid allocating a plurality of frequency domain resources to an unnecessary user, thereby improving the resource use efficiency. In some embodiments, the first frequency domain resource is used by the terminal to initially transmit the uplink information in a first hybrid automatic repeat request (hybrid automatic repeat request, HARQ) process, and the second frequency domain resource is used by the terminal to retransmit the uplink information in the first HARQ process. In this implementation, same data is transmitted in a same HARQ process, so that a combined gain of the data can be obtained, thereby improving data receiving reliability.

In some embodiments, the first frequency domain resource is used by the terminal to initially transmit the uplink information in a first HARQ process, and the second frequency domain resource is used by the terminal to initially transmit the uplink information in a second HARQ process. In this implementation, same data is transmitted in different HARQ processes. Because content transmitted in different HARQ processes can be independently decoded, when data in one HARQ process is missed to be detected or is incorrectly detected, data receiving in another HARQ process is not affected, thereby increasing a probability of successfully receiving data.

In some embodiments, the first frequency domain resource is used by the terminal to send the uplink information in a first bandwidth part (BWP), and the second frequency domain resource is used by the terminal to send the uplink information in a second BWP; the first frequency domain resource is used by the terminal to send the uplink information on a first carrier, and the second frequency domain resource is used by the terminal to send the uplink information on a second carrier; or the first frequency domain resource is used by the terminal to send the uplink information in a first cell, and the second frequency domain resource is used by the terminal to send the uplink information in a second cell.

In some embodiments, the terminal enters an inactive state or an idle state from an active state, and stores an access stratum context of the terminal, where the access stratum context includes packet data convergence protocol (PDCP) duplication configuration information of a radio bearer of the terminal, and the PDCP duplication configuration information includes a PDCP duplication status and/or cell or carrier information used during PDCP duplication transmission; the terminal reestablishes a radio link control (RLC) entity for the PDCP duplication transmission; and the terminal resumes the PDCP duplication status based on the PDCP duplication configuration information included in the stored access stratum context. In some embodiments, the terminal sends a connection resumption request, and receives a connection resumption response by using the RLC entity for the PDCP duplication transmission; the terminal sends a connection establishment request, and receives a connection establishment response by using the RLC entity for the PDCP duplication transmission; or the terminal sends a connection reestablishment request, and receives a connection reestablishment response by using the RLC entity for the PDCP duplication transmission. According to the implementation method, duplication configuration information in context information of a radio bearer is stored, so that an entity or a status required for receiving the connection resumption response, the connection establishment response, or the connection reestablishment response can be quickly configured, thereby reducing a delay in connection resumption, connection establishment, or connection reestablishment.

In some embodiments, the terminal sends second information to a network device. The second information includes cell information used by the terminal during PDCP duplication transmission, and the cell information used by the terminal during the PDCP duplication transmission includes one or more of the following: signal quality information of a cell used by the terminal during the PDCP duplication transmission, signal strength information of a cell used by the terminal during the PDCP duplication transmission, or identification information of a cell used by the terminal during the PDCP duplication transmission; or the second information includes carrier information used by the terminal during PDCP duplication transmission, and the carrier information used by the terminal during the PDCP duplication transmission includes one or more of the following: signal quality information of a carrier used by the terminal during the PDCP duplication transmission, signal strength information of a carrier used by the terminal during the PDCP duplication transmission, or identification information of a carrier used by the terminal during the PDCP duplication transmission. In this implementation, the terminal reports information, so that the network side may determine, based on the reported information, whether there is an appropriate cell or carrier for the PDCP duplication transmission.

In some embodiments, when signal quality or signal strength of the cell used by the terminal during the PDCP duplication transmission is less than a predefined threshold, the terminal sends the second information to the network device; when signal quality or signal strength of the cell used by the terminal during the PDCP duplication transmission is greater than or equal to a predefined threshold, the terminal sends the second information to the network device; when signal quality or signal strength of the carrier used by the terminal during the PDCP duplication transmission is less than a predefined threshold, the terminal sends the second information to the network device; or when signal quality or signal strength of the carrier used by the terminal during the PDCP duplication transmission is greater than or equal to a predefined threshold, the terminal sends the second information to the network device. In the foregoing implementation, the terminal may report the foregoing information under a specific condition, so that an amount of to-be-reported information is reduced, and the network side determines whether there is an appropriate cell or carrier for the PDCP duplication transmission.

In some embodiments, the second information is carried in a connection resumption request, a connection establishment request, a connection reestablishment request, or assistance information.

In some embodiments, the access stratum context includes packet data convergence protocol PDCP duplication configuration information of a radio bearer of the terminal in the active state; or packet data convergence protocol PDCP duplication configuration information that is of a radio bearer of the terminal and that is included in the access stratum context is included in third information sent by the network device.

In some embodiments, the terminal receives fourth information from the network device, and determines, based on the fourth information, whether to store the access stratum context of the terminal.

In some embodiments, the third information is included in a connection release message.

In some embodiments, the fourth information is included in a connection release message.

According to a second aspect, one embodiment provides a data transmission method, including the following steps:

A terminal enters an inactive state or an idle state from an active state, and stores an access stratum context of the terminal, where the access stratum context includes packet data convergence protocol (PDCP) duplication configuration information of a radio bearer of the terminal, and the PDCP duplication configuration information includes a PDCP duplication status and/or cell or carrier information used during PDCP duplication transmission; the terminal reestablishes a radio link control (RLC) entity for the PDCP duplication transmission; and the terminal resumes the PDCP duplication status based on the PDCP duplication configuration information included in the stored access stratum context. In some embodiments, the terminal sends a connection resumption request, and receives a connection resumption response by using the RLC entity for the PDCP duplication transmission; the terminal sends a connection establishment request, and receives a connection establishment response by using the RLC entity for the PDCP duplication transmission; or the terminal sends a connection reestablishment request, and receives a connection reestablishment response by using the RLC entity for the PDCP duplication transmission.

According to the implementation method, duplication configuration information in context information of a radio bearer is stored, so that an entity or a status required for receiving the connection resumption response, the connection establishment response, or the connection reestablishment response can be quickly configured, thereby reducing a delay in connection resumption, connection establishment, or connection reestablishment.

In some embodiments, the terminal sends second information to a network device. The second information includes cell information used by the terminal during PDCP duplication transmission, and the cell information used by the terminal during the PDCP duplication transmission includes one or more of the following: signal quality information of a cell used by the terminal during the PDCP duplication transmission, signal strength information of a cell used by the terminal during the PDCP duplication transmission, or identification information of a cell used by the terminal during the PDCP duplication transmission; or the second information includes carrier information used by the terminal during PDCP duplication transmission, and the carrier information used by the terminal during the PDCP duplication transmission includes one or more of the following: signal quality information of a carrier used by the terminal during the PDCP duplication transmission, signal strength information of a carrier used by the terminal during the PDCP duplication transmission, or identification information of a carrier used by the terminal during the PDCP duplication transmission. In this implementation, the terminal reports information, so that the network side may determine, based on the reported information, whether there is an appropriate cell or carrier for the PDCP duplication transmission.

In some embodiments, when the signal quality or the signal strength of the cell used by the terminal during the PDCP duplication transmission is less than a predefined threshold, the terminal sends the second information to the network device; when the signal quality or the signal strength of the cell used by the terminal during the PDCP duplication transmission is greater than or equal to a predefined threshold, the terminal sends the second information to the network device; when the signal quality or the signal strength of the carrier used by the terminal during the PDCP duplication transmission is less than a predefined threshold, the terminal sends the second information to the network device; or when the signal quality or the signal strength of the carrier used by the terminal during the PDCP duplication transmission is greater than or equal to a predefined threshold, the terminal sends the second information to the network device. In the foregoing implementation, the terminal may report the foregoing information under a specific condition, so that an amount of to-be-reported information is reduced, and the network side determines whether there is an appropriate cell or carrier for the PDCP duplication transmission.

In some embodiments, the second information is carried in a connection resumption request, a connection establishment request, a connection reestablishment request, or assistance information.

In some embodiments, the access stratum context includes packet data convergence protocol PDCP duplication configuration information of a radio bearer of the terminal in the active state; or packet data convergence protocol PDCP duplication configuration information that is of a radio bearer of the terminal and that is included in the access stratum context is included in third information sent by the network device.

In some embodiments, the terminal receives fourth information from the network device, and determines, based on the fourth information, whether to store the access stratum context of the terminal.

In some embodiments, the third information is included in a connection release message.

In some embodiments, the fourth information is included in a connection release message.

In some embodiments, the terminal receives first information from the network device, where the first information includes information related to a first frequency domain resource and information related to a second frequency domain resource; the terminal determines the first frequency domain resource and the second frequency domain resource based on the first information, where the first information is carried in a connection release message, a broadcast message, physical random access channel configuration information, or a random access response; and the terminal sends uplink information by using the first frequency domain resource, and sends the uplink information by using the second frequency domain resource, where the uplink information is used to request connection resumption, connection establishment, or connection reestablishment. According to this implementation, at least two frequency domain resources are configured for transmission of a connection resumption request, a connection establishment request, or a connection reestablishment request, and the connection resumption request, the connection establishment request, or the connection reestablishment request is sent by using the at least two frequency domain resources. In this case, reliability of the transmission of the connection resumption request, the connection establishment request, or the connection reestablishment request can be improved.

In some embodiments, the first frequency domain resource is different from the second frequency domain resource. The connection resumption request, the connection establishment request, or the connection reestablishment request is sent by using at least two resources different in frequency domain, so that frequency domain diversity can be obtained to resist frequency domain selective fading, thereby improving the reliability of the transmission of the connection resumption request, the connection establishment request, or the connection reestablishment request, and reducing a delay in connection resumption, connection establishment, or connection reestablishment.

In some embodiments, the first information is included in the physical random access channel configuration information, the information related to the first frequency domain resource and the information related to the second frequency domain resource is a physical random access channel configuration in the physical random access channel configuration information, and there is a correspondence between the physical random access channel configuration and the first frequency domain resource and the second frequency domain resource.

In some embodiments, the information related to the first frequency domain resource is information indicating the first frequency domain resource, and the information related to the second frequency domain resource is information indicating the second frequency domain resource. In some embodiments, the terminal determines the first frequency domain resource based on the information related to the first frequency domain resource, and determines the second frequency domain resource based on the information related to the second frequency domain resource.

In some embodiments, the information related to the first frequency domain resource is information indicating the first frequency domain resource, and the information related to the second frequency domain resource is information indicating to obtain the second frequency domain resource based on the first frequency domain resource and with reference to a predefined or configured rule. In some embodiments, the predefined or configured rule is a frequency hopping rule, an offset rule, or the like. In some embodiments, the terminal determines the first frequency domain resource based on the information related to the first frequency domain resource, and determines the second frequency domain resource based on the information related to the first frequency domain resource, the information related to the second frequency domain resource, and the predefined or configured rule. In this implementation, overheads of indicating two frequency domain resources can be reduced.

In some embodiments, the first information includes information about M frequency domain resources, where M is an integer greater than 2; and the terminal determines the first frequency domain resource and the second frequency domain resource based on the information about the M frequency domain resources. More frequency domain resources are allocated, so that a probability of a resource conflict can be reduced when the terminal sends the uplink information on a shared frequency domain resource.

In some embodiments, the terminal randomly determines the first frequency domain resource and the second frequency domain resource in the M frequency domain resources indicated by the information about the M frequency domain resources; the terminal determines, based on an identifier of a terminal, the first frequency domain resource and the second frequency domain resource in the M frequency domain resources indicated by the information about the M frequency domain resources; or the terminal determines, based on a cause for a connection request, the first frequency domain resource and the second frequency domain resource in the M frequency domain resources indicated by the information about the M frequency domain resources, where the connection request is a connection resumption request, a connection establishment request, or a connection reestablishment request.

In some embodiments, the terminal determines, based on a cause for a connection request, whether to send the uplink information by using the first frequency domain resource, and send the uplink information by using the second frequency domain resource, where the connection request is a connection resumption request, a connection establishment request, or a connection reestablishment request; or the terminal determines, based on a higher layer indication of the terminal or a higher layer request of the terminal, whether to send the uplink information by using the first frequency domain resource, and send the uplink information by using the second frequency domain resource. In the foregoing implementations, data of a high priority or a high service requirement may be transmitted by using two frequency domain resources, and data of a low priority or a low service requirement may be transmitted still by using one frequency domain resource. In this way, reliability of the data of a high priority or a high service requirement is ensured, and resource use efficiency is improved.

In some embodiments, the terminal obtains a physical random access channel configuration based on the physical random access channel configuration information, where the physical random access channel configuration is used to configure a time-frequency resource and a format of a random access preamble.

In some embodiments, the physical random access channel configuration corresponds to the first frequency domain resource and the second frequency domain resource; and the terminal determines the first frequency domain resource and the second frequency domain resource based on the physical random access channel configuration. In this implementation, the network may determine, based on a random access channel (random access channel, RACH) request, whether to allocate a plurality of frequency domain resources to the terminal, to avoid allocating a plurality of frequency domain resources to an unnecessary user, thereby improving the resource use efficiency.

In some embodiments, the first frequency domain resource is used by the terminal to initially transmit the uplink information in a first hybrid automatic repeat request (hybrid automatic repeat request, HARQ) process, and the second frequency domain resource is used by the terminal to retransmit the uplink information in the first HARQ process. In this implementation, same data is transmitted in a same HARQ process, so that a combined gain of the data can be obtained, thereby improving data receiving reliability.

In some embodiments, the first frequency domain resource is used by the terminal to initially transmit the uplink information in a first HARQ process, and the second frequency domain resource is used by the terminal to initially transmit the uplink information in a second HARQ process. In this implementation, same data is transmitted in different HARQ processes. Because content transmitted in different HARQ processes can be independently decoded, when data in one HARQ process is missed to be detected or is incorrectly detected, data receiving in another HARQ process is not affected, thereby increasing a probability of successfully receiving data.

In some embodiments, the first frequency domain resource is used by the terminal to send the uplink information in a first bandwidth part (BWP), and the second frequency domain resource is used by the terminal to send the uplink information in a second BWP; the first frequency domain resource is used by the terminal to send the uplink information on a first carrier, and the second frequency domain resource is used by the terminal to send the uplink information on a second carrier; or the first frequency domain resource is used by the terminal to send the uplink information in a first cell, and the second frequency domain resource is used by the terminal to send the uplink information in a second cell.

According to a third aspect, one embodiment provides a data transmission method, including:

A network device sends first information, where the first information includes information related to a first frequency domain resource and information related to a second frequency domain resource, the first information is used by a terminal to determine the first frequency domain resource and the second frequency domain resource, and the first information is carried in a connection release message, a broadcast message, physical random access channel configuration information, or a random access response; and receiving, by the network device on the first frequency domain resource, uplink information from the terminal, and receiving, on the second frequency domain resource, the uplink information from the terminal, where the uplink information is used to request connection resumption, connection establishment, or connection reestablishment.

According to the method provided in this embodiment, at least two frequency domain resources are configured for transmission of a connection resumption request, a connection establishment request, or a connection reestablishment request, and the connection resumption request, the connection establishment request, or the connection reestablishment request is sent by using the at least two frequency domain resources. In this case, reliability of the transmission of the connection resumption request, the connection establishment request, or the connection reestablishment request can be improved.

In some embodiments, the first frequency domain resource is different from the second frequency domain resource. The connection resumption request, the connection establishment request, or the connection reestablishment request is sent by using at least two resources different in frequency domain, so that frequency domain diversity can be obtained to resist frequency domain selective fading, thereby improving the reliability of the transmission of the connection resumption request, the connection establishment request, or the connection reestablishment request, and reducing a delay in connection resumption, connection establishment, or connection reestablishment.

In some embodiments, the first information is included in the physical random access channel configuration information, the information related to the first frequency domain resource and the information related to the second frequency domain resource is a physical random access channel configuration in the physical random access channel configuration information, and there is a correspondence between the physical random access channel configuration and the first frequency domain resource and the second frequency domain resource.

In some embodiments, the information related to the first frequency domain resource is information indicating the first frequency domain resource, and the information related to the second frequency domain resource is information indicating the second frequency domain resource. In some embodiments, the terminal determines the first frequency domain resource based on the information related to the first frequency domain resource, and determines the second frequency domain resource based on the information related to the second frequency domain resource.

In some embodiments, the information related to the first frequency domain resource is information indicating the first frequency domain resource, and the information related to the second frequency domain resource is information indicating to obtain the second frequency domain resource based on the first frequency domain resource and with reference to a predefined or configured rule. In some embodiments, the predefined or configured rule is a frequency hopping rule, an offset rule, or the like. In some embodiments, the terminal determines the first frequency domain resource based on the information related to the first frequency domain resource, and determines the second frequency domain resource based on the information related to the first frequency domain resource, the information related to the second frequency domain resource, and the predefined or configured rule. In this implementation, overheads of indicating two frequency domain resources can be reduced.

In some embodiments, the first information includes information about M frequency domain resources, where M is an integer greater than 2; and the information about the M frequency domain resources is used by the terminal to determine the first frequency domain resource and the second frequency domain resource based on the M frequency domain resources indicated by the information about the M frequency domain resources. More frequency domain resources are allocated, so that a probability of a resource conflict can be reduced when the terminal sends the uplink information on a shared frequency domain resource.

In some embodiments, the network device receives second information. The second information includes cell information used by the terminal during PDCP duplication transmission, and the cell information used by the terminal during the PDCP duplication transmission includes one or more of the following: signal quality information of a cell used by the terminal during the PDCP duplication transmission, signal strength information of a cell used by the terminal during the PDCP duplication transmission, or identification information of a cell used by the terminal during the PDCP duplication transmission; or the second information includes carrier information used by the terminal during PDCP duplication transmission, and the carrier information used by the terminal during the PDCP duplication transmission includes one or more of the following: signal quality information of a carrier used by the terminal during the PDCP duplication transmission, signal strength information of a carrier used by the terminal during the PDCP duplication transmission, or identification information of a carrier used by the terminal during the PDCP duplication transmission. In this implementation, the terminal reports information, so that the network side may determine, based on the reported information, whether there is an appropriate cell or carrier for the PDCP duplication transmission.

In some embodiments, the second information is carried in a connection resumption request, a connection establishment request, a connection reestablishment request, or assistance information.

In some embodiments, the network device sends third information, where the third information includes PDCP duplication configuration information of a radio bearer of the terminal, the PDCP duplication configuration information is included in an access stratum context of the terminal, and the PDCP duplication configuration information includes a PDCP duplication status and/or cell or carrier information used during the PDCP duplication transmission.

In some embodiments, the network device sends fourth information, where the fourth information is used to indicate whether the terminal stores the access stratum context of the terminal.

In some embodiments, the third information is included in a connection release message. In some embodiments, the fourth information is included in a connection release message.

According to a fourth aspect, one embodiment provides a data transmission method, including:

receiving, by a network device, second information. The second information includes cell information used by a terminal during PDCP duplication transmission, and the cell information used by the terminal during the PDCP duplication transmission includes one or more of the following: signal quality information of a cell used by the terminal during the PDCP duplication transmission, signal strength information of a cell used by the terminal during the PDCP duplication transmission, or identification information of a cell used by the terminal during the PDCP duplication transmission; or the second information includes carrier information used by a terminal during PDCP duplication transmission, and the carrier information used by the terminal during the PDCP duplication transmission includes one or more of the following: signal quality information of a carrier used by the terminal during the PDCP duplication transmission, signal strength information of a carrier used by the terminal during the PDCP duplication transmission, or identification information of a carrier used by the terminal during the PDCP duplication transmission.

In this implementation, the terminal reports information, so that the network side may determine, based on the reported information, whether there is an appropriate cell or carrier for the PDCP duplication transmission.

In some embodiments, the network device stores an access stratum context of the terminal, where the access stratum context includes PDCP duplication configuration information of a radio bearer of the terminal, and the PDCP duplication configuration information includes a PDCP duplication status and/or cell or carrier information used during the PDCP duplication transmission.

In some embodiments, the second information is carried in a connection resumption request, a connection establishment request, a connection reestablishment request, or assistance information.

In some embodiments, the network device sends third information, where the third information includes PDCP duplication configuration information of a radio bearer of the terminal, the PDCP duplication configuration information is included in an access stratum context of the terminal, and the PDCP duplication configuration information includes a PDCP duplication status and/or cell or carrier information used during the PDCP duplication transmission.

In some embodiments, the network device sends fourth information, where the fourth information is used to indicate whether the terminal stores the access stratum context of the terminal.

In some embodiments, the third information is included in a connection release message.

In some embodiments, the fourth information is included in a connection release message.

In some embodiments, the network device sends first information, where the first information includes information related to a first frequency domain resource and information related to a second frequency domain resource, the first information is used by the terminal to determine the first frequency domain resource and the second frequency domain resource, and the first information is carried in a connection release message, a broadcast message, physical random access channel configuration information, or a random access response; and the first frequency domain resource is used by the terminal to send uplink information, and the second frequency domain resource is used by the terminal to send the uplink information, where the uplink information is used to request connection resumption, connection establishment, or connection reestablishment.

According to the method provided in this embodiment, at least two frequency domain resources are configured for transmission of a connection resumption request, a connection establishment request, or a connection reestablishment request, and the connection resumption request, the connection establishment request, or the connection reestablishment request is sent by using the at least two frequency domain resources. In this case, reliability of the transmission of the connection resumption request, the connection establishment request, or the connection reestablishment request can be improved.

In some embodiments, the first frequency domain resource is different from the second frequency domain resource. The connection resumption request, the connection establishment request, or the connection reestablishment request is sent by using at least two resources different in frequency domain, so that frequency domain diversity can be obtained to resist frequency domain selective fading, thereby improving the reliability of the transmission of the connection resumption request, the connection establishment request, or the connection reestablishment request, and reducing a delay in connection resumption, connection establishment, or connection reestablishment.

In some embodiments, the first information is included in the physical random access channel configuration information, the information related to the first frequency domain resource and the information related to the second frequency domain resource is a physical random access channel configuration in the physical random access channel configuration information, and there is a correspondence between the physical random access channel configuration and the first frequency domain resource and the second frequency domain resource.

In some embodiments, the information related to the first frequency domain resource is information indicating the first frequency domain resource, and the information related to the second frequency domain resource is information indicating the second frequency domain resource. In some embodiments, the terminal determines the first frequency domain resource based on the information related to the first frequency domain resource, and determines the second frequency domain resource based on the information related to the second frequency domain resource.

In some embodiments, the information related to the first frequency domain resource is information indicating the first frequency domain resource, and the information related to the second frequency domain resource is information indicating to obtain the second frequency domain resource based on the first frequency domain resource and with reference to a predefined or configured rule. In some embodiments, the predefined or configured rule is a frequency hopping rule, an offset rule, or the like. In some embodiments, the terminal determines the first frequency domain resource based on the information related to the first frequency domain resource, and determines the second frequency domain resource based on the information related to the first frequency domain resource, the information related to the second frequency domain resource, and the predefined or configured rule. In this implementation, overheads of indicating two frequency domain resources can be reduced.

In some embodiments, the first information includes information about M frequency domain resources, where M is an integer greater than 2; and the information about the M frequency domain resources is used by the terminal to determine the first frequency domain resource and the second frequency domain resource based on the M frequency domain resources indicated by the information about the M frequency domain resources. More frequency domain resources are allocated, so that a probability of a resource conflict can be reduced when the terminal sends the uplink information on a shared frequency domain resource.

According to a fifth aspect, one embodiment provides a data transmission method, including:

sending, by a network device, third information, where the third information includes PDCP duplication configuration information of a radio bearer of a terminal, the PDCP duplication configuration information is included in an access stratum context of the terminal, and the PDCP duplication configuration information includes a PDCP duplication status and/or cell or carrier information used during PDCP duplication transmission. In some embodiments, the third information is included in a connection release message.

In the implementation method, the network device configures duplication configuration information in context information of the radio bearer of the terminal, so that the terminal does not need to maintain the duplication configuration information before receiving the duplication configuration information, thereby reducing implementation complexity of the terminal.

In some embodiments, the network device stores an access stratum context of the terminal, where the access stratum context includes PDCP duplication configuration information of a radio bearer of the terminal, and the PDCP duplication configuration information includes a PDCP duplication status and/or cell or carrier information used during the PDCP duplication transmission.

In some embodiments, the network device receives second information. The second information includes cell information used by the terminal during PDCP duplication transmission, and the cell information used by the terminal during the PDCP duplication transmission includes one or more of the following: signal quality information of a cell used by the terminal during the PDCP duplication transmission, signal strength information of a cell used by the terminal during the PDCP duplication transmission, or identification information of a cell used by the terminal during the PDCP duplication transmission; or the second information includes carrier information used by the terminal during PDCP duplication transmission, and the carrier information used by the terminal during the PDCP duplication transmission includes one or more of the following: signal quality information of a carrier used by the terminal during the PDCP duplication transmission, signal strength information of a carrier used by the terminal during the PDCP duplication transmission, or identification information of a carrier used by the terminal during the PDCP duplication transmission. In some embodiments, the second information is carried in a connection resumption request, a connection establishment request, a connection reestablishment request, or assistance information. In this implementation, the terminal reports information, so that the network side may determine, based on the reported information, whether there is an appropriate cell or carrier for the PDCP duplication transmission.

In some embodiments, the network device sends fourth information, where the fourth information is used to indicate whether the terminal stores the access stratum context of the terminal. In some embodiments, the fourth information is included in a connection release message.

In some embodiments, the network device sends first information, where the first information includes information related to a first frequency domain resource and information related to a second frequency domain resource, the first information is used by the terminal to determine the first frequency domain resource and the second frequency domain resource, and the first information is carried in a connection release message, a broadcast message, physical random access channel configuration information, or a random access response; and the first frequency domain resource is used by the terminal to send uplink information, and the second frequency domain resource is used by the terminal to send the uplink information, where the uplink information is used to request connection resumption, connection establishment, or connection reestablishment.

According to the method provided in this embodiment, at least two frequency domain resources are configured for transmission of a connection resumption request, a connection establishment request, or a connection reestablishment request, and the connection resumption request, the connection establishment request, or the connection reestablishment request is sent by using the at least two frequency domain resources. In this case, reliability of the transmission of the connection resumption request, the connection establishment request, or the connection reestablishment request can be improved.

In some embodiments, the first frequency domain resource is different from the second frequency domain resource. The connection resumption request, the connection establishment request, or the connection reestablishment request is sent by using at least two resources different in frequency domain, so that frequency domain diversity can be obtained to resist frequency domain selective fading, thereby improving the reliability of the transmission of the connection resumption request, the connection establishment request, or the connection reestablishment request, and reducing a delay in connection resumption, connection establishment, or connection reestablishment.

In some embodiments, the first information is included in the physical random access channel configuration information, the information related to the first frequency domain resource and the information related to the second frequency domain resource is a physical random access channel configuration in the physical random access channel configuration information, and there is a correspondence between the physical random access channel configuration and the first frequency domain resource and the second frequency domain resource.

In some embodiments, the information related to the first frequency domain resource is information indicating the first frequency domain resource, and the information related to the second frequency domain resource is information indicating the second frequency domain resource. In some embodiments, the terminal determines the first frequency domain resource based on the information related to the first frequency domain resource, and determines the second frequency domain resource based on the information related to the second frequency domain resource.

In some embodiments, the information related to the first frequency domain resource is information indicating the first frequency domain resource, and the information related to the second frequency domain resource is information indicating to obtain the second frequency domain resource based on the first frequency domain resource and with reference to a predefined or configured rule. In some embodiments, the predefined or configured rule is a frequency hopping rule, an offset rule, or the like. In some embodiments, the terminal determines the first frequency domain resource based on the information related to the first frequency domain resource, and determines the second frequency domain resource based on the information related to the first frequency domain resource, the information related to the second frequency domain resource, and the predefined or configured rule. In this implementation, overheads of indicating two frequency domain resources can be reduced.

In some embodiments, the first information includes information about M frequency domain resources, where M is an integer greater than 2; and the information about the M frequency domain resources is used by the terminal to determine the first frequency domain resource and the second frequency domain resource based on the M frequency domain resources indicated by the information about the M frequency domain resources. More frequency domain resources are allocated, so that a probability of a resource conflict can be reduced when the terminal sends the uplink information on a shared frequency domain resource.

According to a sixth aspect, one embodiment provides a data transmission method, including:

sending, by a network device, fourth information, where the fourth information is used to indicate whether a terminal stores an access stratum context of the terminal, the access stratum context of the terminal includes PDCP duplication configuration information of a radio bearer of the terminal, and the PDCP duplication configuration information includes a PDCP duplication status and/or cell or carrier information used during PDCP duplication transmission. In some embodiments, the fourth information is included in a connection release message. In this implementation, the terminal is configured to store, under a condition, the access stratum context including the PDCP duplication configuration information, so that storage overheads of the terminal can be reduced.

In some embodiments, the network device receives second information. The second information includes cell information used by the terminal during PDCP duplication transmission, and the cell information used by the terminal during the PDCP duplication transmission includes one or more of the following: signal quality information of a cell used by the terminal during the PDCP duplication transmission, signal strength information of a cell used by the terminal during the PDCP duplication transmission, or identification information of a cell used by the terminal during the PDCP duplication transmission; or the second information includes carrier information used by the terminal during PDCP duplication transmission, and the carrier information used by the terminal during the PDCP duplication transmission includes one or more of the following: signal quality information of a carrier used by the terminal during the PDCP duplication transmission, signal strength information of a carrier used by the terminal during the PDCP duplication transmission, or identification information of a carrier used by the terminal during the PDCP duplication transmission. In some embodiments, the second information is carried in a connection resumption request, a connection establishment request, a connection reestablishment request, or assistance information. In this implementation, the terminal reports information, so that the network side may determine, based on the reported information, whether there is an appropriate cell or carrier for the PDCP duplication transmission.

In some embodiments, the network device sends third information, where the third information includes PDCP duplication configuration information of a radio bearer of the terminal, the PDCP duplication configuration information is included in an access stratum context of the terminal, and the PDCP duplication configuration information includes a PDCP duplication status and/or cell or carrier information used during the PDCP duplication transmission. In some embodiments, the third information is included in a connection release message.

In some embodiments, the network device sends first information, where the first information includes information related to a first frequency domain resource and information related to a second frequency domain resource, the first information is used by the terminal to determine the first frequency domain resource and the second frequency domain resource, and the first information is carried in a connection release message, a broadcast message, physical random access channel configuration information, or a random access response; and the first frequency domain resource is used by the terminal to send uplink information, and the second frequency domain resource is used by the terminal to send the uplink information, where the uplink information is used to request connection resumption, connection establishment, or connection reestablishment.

According to the method provided in this embodiment, at least two frequency domain resources are configured for transmission of a connection resumption request, a connection establishment request, or a connection reestablishment request, and the connection resumption request, the connection establishment request, or the connection reestablishment request is sent by using the at least two frequency domain resources. In this case, reliability of the transmission of the connection resumption request, the connection establishment request, or the connection reestablishment request can be improved.

In some embodiments, the first frequency domain resource is different from the second frequency domain resource. The connection resumption request, the connection establishment request, or the connection reestablishment request is sent by using at least two resources different in frequency domain, so that frequency domain diversity can be obtained to resist frequency domain selective fading, thereby improving the reliability of the transmission of the connection resumption request, the connection establishment request, or the connection reestablishment request, and reducing a delay in connection resumption, connection establishment, or connection reestablishment.

In some embodiments, the first information is included in the physical random access channel configuration information, the information related to the first frequency domain resource and the information related to the second frequency domain resource is a physical random access channel configuration in the physical random access channel configuration information, and there is a correspondence between the physical random access channel configuration and the first frequency domain resource and the second frequency domain resource.

In some embodiments, the information related to the first frequency domain resource is information indicating the first frequency domain resource, and the information related to the second frequency domain resource is information indicating the second frequency domain resource. In some embodiments, the terminal determines the first frequency domain resource based on the information related to the first frequency domain resource, and determines the second frequency domain resource based on the information related to the second frequency domain resource.

In some embodiments, the information related to the first frequency domain resource is information indicating the first frequency domain resource, and the information related to the second frequency domain resource is information indicating to obtain the second frequency domain resource based on the first frequency domain resource and with reference to a predefined or configured rule. In some embodiments, the predefined or configured rule is a frequency hopping rule, an offset rule, or the like. In some embodiments, the terminal determines the first frequency domain resource based on the information related to the first frequency domain resource, and determines the second frequency domain resource based on the information related to the first frequency domain resource, the information related to the second frequency domain resource, and the predefined or configured rule. In this implementation, overheads of indicating two frequency domain resources can be reduced.

In some embodiments, the first information includes information about M frequency domain resources, where M is an integer greater than 2; and the information about the M frequency domain resources is used by the terminal to determine the first frequency domain resource and the second frequency domain resource based on the M frequency domain resources indicated by the information about the M frequency domain resources. More frequency domain resources are allocated, so that a probability of a resource conflict can be reduced when the terminal sends the uplink information on a shared frequency domain resource.

According to a seventh aspect, this application provides a communications apparatus, to implement one or more corresponding functions of the communications apparatus of the foregoing terminal and/or the communications apparatus of the foregoing network device. The communications apparatus includes a corresponding unit or component configured to perform the foregoing methods. The unit included in the communications apparatus may be implemented by software and/or hardware. The communications apparatus may be, for example, a terminal, a network device (for example, a base station), or a chip, a chip system, a processor, or the like that can support the terminal or the network device in implementing the foregoing functions.

According to an eighth aspect, this application provides a communications apparatus, including a processor and a memory, where the memory is configured to store a program, and when the program is executed by the processor, the communications apparatus is enabled to implement the method according to any one of the first aspect to the sixth aspect.

According to a ninth aspect, this application provides a storage medium, where the storage medium stores a computer program, and when the computer program is executed by a processor, the method according to any one of the first aspect to the sixth aspect is implemented.

According to a tenth aspect, this application provides a chip system, including a processor, configured to support a communications apparatus in implementing the method described in any one of the first aspect to the sixth aspect.

According to an eleventh aspect, this application provides a communications system, including the communications apparatus of the foregoing terminal and the communications apparatus of the foregoing network device.

DESCRIPTION OF EMBODIMENTS

Figure 2:
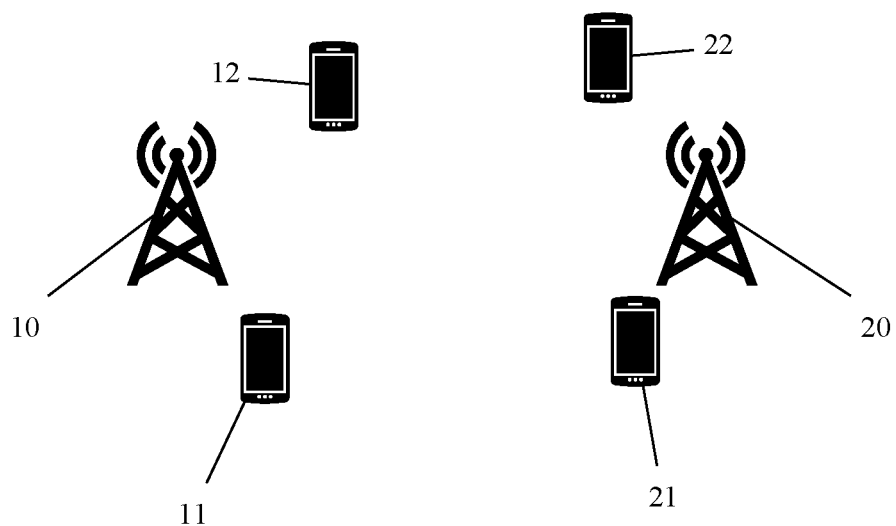
FIG. 2 is a schematic diagram of a communications system to which one embodiment is applied.

A transmission method and an apparatus provided in various embodiments may be applied to a communications system. FIG. 2 is a schematic structural diagram of a communications system. The communications system includes one or more network devices (for clarity, a network device 10 and a network device 20 are shown in the figure), and one or more terminals that communicate with the one or more network devices. A terminal 11 and a terminal 12 shown in the figure are connected to the network device 10, and a terminal 21 and a terminal 22 shown in the figure are connected to the network device 20. A communications device in accordance with the present disclosure may be a terminal or a network device.

The technologies described in the various embodiments may be applied to various communications systems, for example, 2G, 3G, 4G, 4.5G, and 5G communications systems, a system converged by a plurality of communications systems, or a future evolved network. The various communications systems are, for example, a code division multiple access (CDMA) system, a wideband code division multiple access (WCDMA) system, a time division multiple access (TDMA) system, a frequency division multiple access (FDMA) system, an orthogonal frequency-division multiple access (OFDMA) system, a single carrier frequency division multiple access (SC-FDMA) system, a long term evolution (LTE) system, a new radio (NR) system, a wireless fidelity (Wi-Fi) system, a worldwide interoperability for microwave access (WiMAX) system, and a 3rd generation partnership project (3GPP)-related cellular system, and other communications systems of this type.

In accordance with the present disclosure, the network device may be any device with wireless receiving and sending functions. The network device includes but is not limited to: a base transceiver station (BTS) in global system for mobile communications (GSM) or CDMA, a NodeB (NodeB) in WCDMA, an evolved NodeB (NodeB or eNB or e-NodeB, evolutional Node B) in LTE, a base station (gNodeB or gNB) or a transmission reception point (TRP) in NR, a subsequently evolved base station based on 3GPP standards, an access node in a Wi-Fi system, a wireless relay node, a wireless backhaul node, or the like. The base station may be a macro base station, a micro base station, a pico base station, a small cell, a relay station, a balloon station, or the like. A plurality of base stations can support networks using a same technology mentioned above, or may support networks using different technologies mentioned above. The base station may include one or more co-site or non-co-site transmission reception points (TRP). The network device may alternatively be a radio controller, a centralized unit (CU), and/or a distributed unit (DU) in a cloud radio access network (CRAN) scenario. In some embodiments, in a centralized unit-distributed unit (CU-DU) architecture, one network device may be logically used as one system, and may include one CU and at least one DU. The CU is configured to implement functions of protocol layers such as a PDCP layer, an RRC layer, and other layers above the PDCP layer and the RRC layer of a radio access device, and the DU is configured to implement functions of the RLC layer, a MAC layer, and a PHY layer. Alternatively, the network device may be a server, a cloud server, a cloud processor, a wearable device, a vehicle-mounted device, or the like. An example in which the network device is a base station is used for description below. The plurality of network devices may be base stations of a same type or base stations of different types. The base station may communicate with the terminal, or may communicate with the terminal by using a relay station. The terminal may communicate with a plurality of base stations using different technologies. For example, the terminal may communicate with a base station supporting an LTE network, or communicate with a base station supporting a 5G network, or may support a dual connection to a base station in an LTE network and a base station in a 5G network.

The terminal is a device with wireless receiving and sending functions. The terminal may be deployed on land, indoor or outdoor, or may be hand-held, wearable, or vehicle-mounted; may be deployed on a water surface (for example, on a ship); or may be deployed in the air (for example, in an airplane, a balloon, and a satellite). The terminal may be a mobile phone, a tablet computer (Pad), a computer with wireless receiving and sending functions, a virtual reality (VR) terminal device, an augmented reality (AR) terminal device, a wireless terminal in industrial control, a vehicle-mounted terminal device, a wireless terminal in self driving, a wireless terminal in remote medical, a wireless terminal in a smart grid, a wireless terminal in transportation safety, a wireless terminal in a smart city, a wireless terminal in a smart home, a wearable terminal device, a customer-premises equipment (CPE), or the like. An application scenario is not limited in various embodiments. Sometimes, the terminal may also be referred to as a terminal device, user equipment (UE), an access terminal device, a vehicle-mounted terminal, a UE unit, a UE station, a mobile station, a remote station, a remote terminal device, a mobile device, a UE terminal device, a terminal device, a wireless communications device, a UE agent, a UE apparatus, or the like. The terminal may be fixed or mobile.

The terminal may access the network device through a random access procedure, and further establish at least one radio bearer (RB) with the network device to transmit data. The data may include signaling data and service data. A radio bearer mainly used to transmit the signaling data is a signaling radio bearer (SRB), and a radio bearer mainly used to transmit the service data is a data radio bearer (DRB). The service data includes enhanced mobile broadband (eMBB) data, massive machine-type communication (MTC) data, ultra-reliable low-latency communication (URLLC) data, and the like.

With the evolution of a wireless communications system, data transmission reliability in a random access procedure may fail to meet a development requirement of the wireless communications system. Consequently, an access delay is relatively high, and experience of the terminal is affected.

Figure 1:
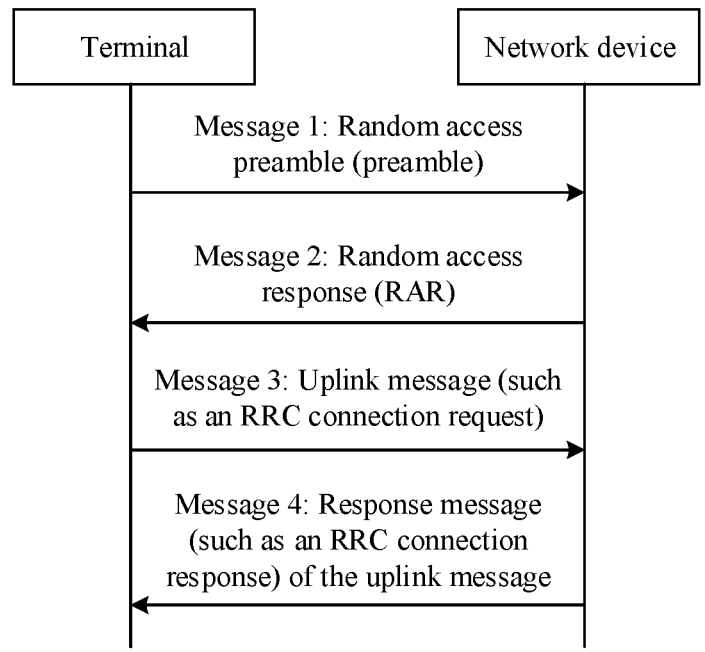
FIG. 1 is a schematic interaction diagram of a random access procedure according to one embodiment.

In a possible scenario, a terminal in an idle (IDLE) state or an inactive (INACTIVE) state triggers a random access procedure, and intends to establish or resume a connection, to enter an active (ACTIVE) state. The terminal may send a random access preamble to the network device, send a connection resumption request, a connection establishment request, or a connection reestablishment request (where all the foregoing three requests may be understood as a message 3 in FIG. 1) to the network device based on a received random access response, and then receive a response message (which may be understood as a message 4 in FIG. 1) sent by the network device in response to the connection resumption request, the connection establishment request, or the connection reestablishment request, to establish or resume a connection.

However, some types of data have high requirements on reliability and a delay. For example, URLLC data generally requires transmission reliability of 99.999% and an end-to-end ultra-low latency of 1 ms. The connection resumption request, the connection establishment request, or the connection reestablishment request (where all the foregoing three requests may be understood as the message 3 in FIG. 1) sent by the terminal, and the response message (which may be understood as the message 4 in FIG. 1) sent by the network device in response to the connection resumption request, the connection establishment request, or the connection reestablishment request may not meet the requirement on high reliability.

According to the transmission method and the apparatus provided in various embodiments, at least two frequency domain resources are configured for transmission of the connection resumption request, the connection establishment request, or the connection reestablishment request, and the connection resumption request, the connection establishment request, or the connection reestablishment request is sent by using the at least two frequency domain resources. According to the method, reliability of the transmission of the connection resumption request, the connection establishment request, or the connection reestablishment request can be improved. According to the transmission method and the apparatus provided in the Various embodiments, duplication configuration information in context information of a radio bearer is further saved, so that an entity or a status required for receiving a connection resumption response, a connection establishment response, or a connection reestablishment response is quickly configured, thereby reducing a delay in connection resumption, connection establishment, or connection reestablishment.

The following describes the technical solutions of this application in detail by using specific embodiments with reference to the accompanying drawings. The following specific embodiments may be independent of each other or may be combined with each other, and a same or similar concept or process may not be described in detail in some embodiments.

Figure 3:
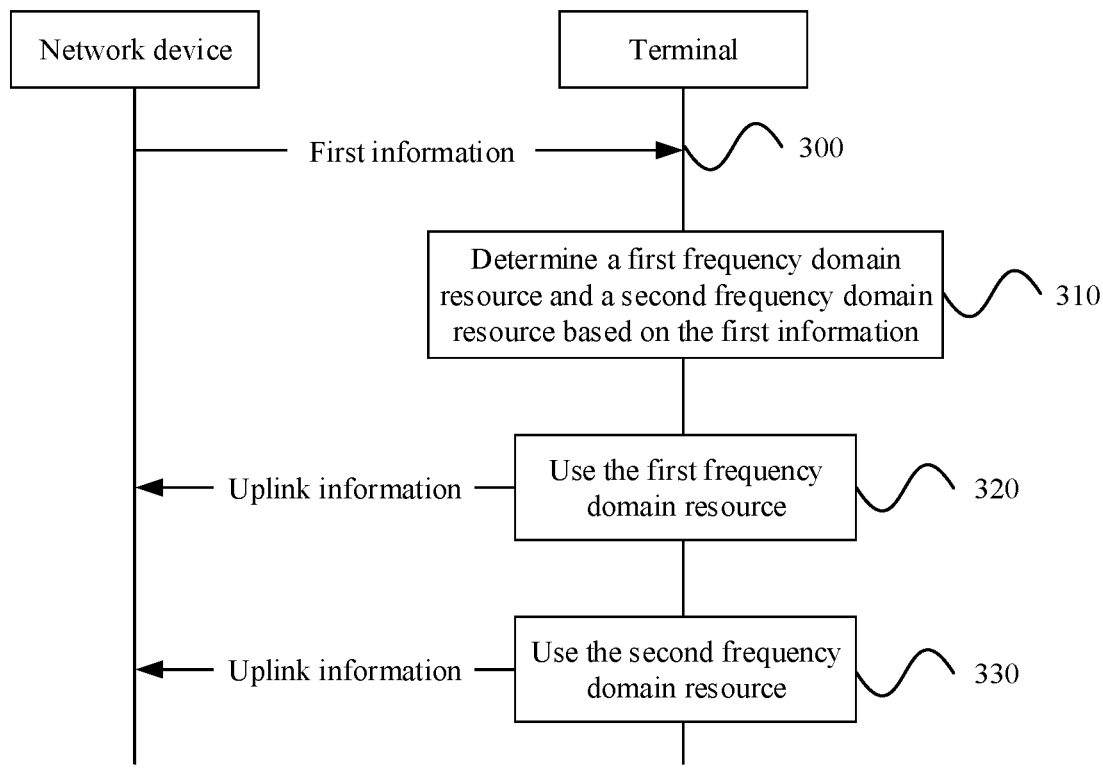
FIG. 3 is a schematic flowchart of an uplink information transmission method according to one embodiment.

FIG. 3 is a schematic flowchart of an uplink information transmission method according to one embodiment. As shown in FIG. 3, the method in this embodiment may include the following steps.

Operation 300: A terminal receives first information from a network device, where the first information includes information related to a first frequency domain resource and information related to a second frequency domain resource. It may be understood that the first information may be included in different messages, or may be included in different information elements of a same message.

Operation 310: The terminal determines the first frequency domain resource and the second frequency domain resource based on the first information.

Operation 320: The terminal sends uplink information by using the first frequency domain resource.

Operation 330: The terminal sends the uplink information by using the second frequency domain resource.

In some embodiments, the first information may be carried in a connection release message, a broadcast message, physical random access channel configuration information, or a random access response. The connection release message is used by the network device to indicate the terminal to release a connection. The releasing a connection may also be understood as that the terminal device leaves an ACTIVE state and enters an INACTIVE state or an IDLE state. The broadcast message is used to notify the terminal of cell-level configuration information. For example, the broadcast message may be carried in a system information block (SIB), remaining minimum system information (RMSI), other system information (OSI), or a master information block (MIB). The physical random access channel configuration information is used to notify the terminal of a physical random access channel configuration, and the physical random access channel configuration is used to configure a time-frequency resource and a format of a random access preamble (a preamble, which may be understood as a message 1 in a random access procedure, and reference may be made to FIG. 1). The foregoing random access response is a message 2 in the random access procedure (refer to FIG. 1).

In some embodiments, the uplink information in operation 320 and operation 330 may be uplink service data sent by the terminal. The uplink information may alternatively be signaling data sent by the terminal. For example, the signaling data may be a connection resumption request, a connection establishment request, or a connection reestablishment request. The connection resumption request is used by the terminal to request the network device for connection resumption, the connection establishment request is used by the terminal to request the network device for connection establishment, and the connection reestablishment request is used by the terminal to request the network device for connection reestablishment. The requesting to resume a connection may include requesting to resume an ACTIVE state, the requesting to establish a connection may include requesting to establish an ACTIVE state, and the requesting to reestablish a connection may include requesting to reestablish an ACTIVE state. It may be understood that the uplink information may alternatively be uplink service data and signaling data that are sent by the terminal.

It may be understood that, that a quantity of frequency domain resources determined based on the first information is greater than or equal to 2 falls within the present disclosure. In this embodiment, an example in which two frequency domain resources are determined based on the first information is used to describe a specific implementation of this application.

In operation 300 and operation 310, the first information includes the information related to the first frequency domain resource and the information related to the second frequency domain resource, and the terminal determines the first frequency domain resource and the second frequency domain resource based on the first information.

It may be understood that, the information related to the first frequency domain resource and the information related to the second frequency domain resource may have different forms.

In a implementation, if the first information is included in the physical random access channel configuration information, the information related to the first frequency domain resource and the information related to the second frequency domain resource may be a physical random access channel configuration in the foregoing physical random access channel configuration information, and if there is a correspondence between the physical random access channel configuration and the first frequency domain resource and the second frequency domain resource, the terminal may obtain the first frequency domain resource and the second frequency domain resource based on the physical random access channel configuration.

In another implementation, the information related to the first frequency domain resource is information indicating the first frequency domain resource, and the information related to the second frequency domain resource is information indicating the second frequency domain resource.

Figure 4A:
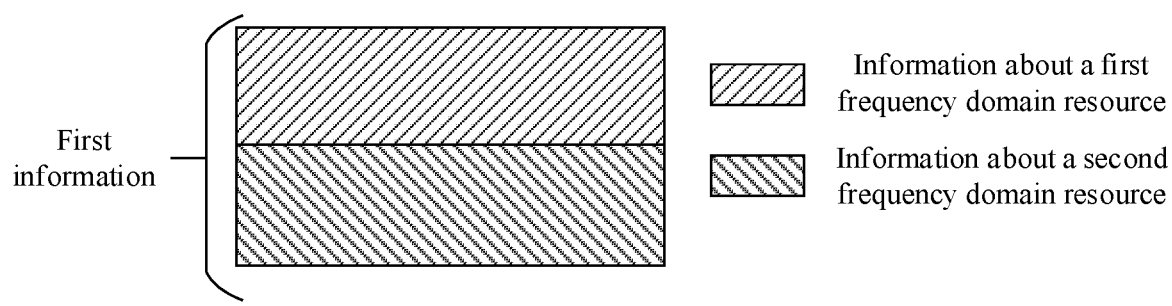
FIG. 4A is a schematic diagram of first information according to one embodiment.

For example, first information shown in FIG. 4A is used as an example. The first information includes two fields. One field carries the information indicating the first frequency domain resource, and the other field carries the information indicating the second frequency domain resource. The terminal may respectively obtain the information about the first frequency domain resource and the information about the second frequency domain resource by using the foregoing two fields, to determine the first frequency domain resource and the second frequency domain resource. For example, the first information may be included in a random access response grant field (RAR grant field) shown in Table 1A. For example, the first frequency domain resource is indicated by Msg3 physical uplink shared channel frequency domain resource allocation0 (Msg3 PUSCH (Physical Uplink Shared Channel) frequency resource allocation0) in Table 1A, and Msg3 PUSCH frequency resource allocation0 may be understood as the information related to the first frequency domain resource. The second frequency domain resource is indicated by Msg3 physical uplink shared channel frequency domain resource allocation1 (Msg3 PUSCH frequency resource allocation1) in Table 1A, and Msg3 PUSCH frequency resource allocation1 may be understood as the information related to the second frequency domain resource. In some embodiments, Table 2A is used as an example. The random access response may further include an indicator (Indicator), indicating whether Msg3 PUSCH frequency resource allocation1 exists in the random access response.

TABLE 1A

RAR grant field

...
Msg3 PUSCH frequency resource allocation0
Msg3 PUSCH frequency resource allocation1
...

TABLE 2A

RAR grant field

...
Msg3 PUSCH frequency resource allocation0
Msg3 PUSCH frequency resource allocation1
Indicator
...

Figure 4B:
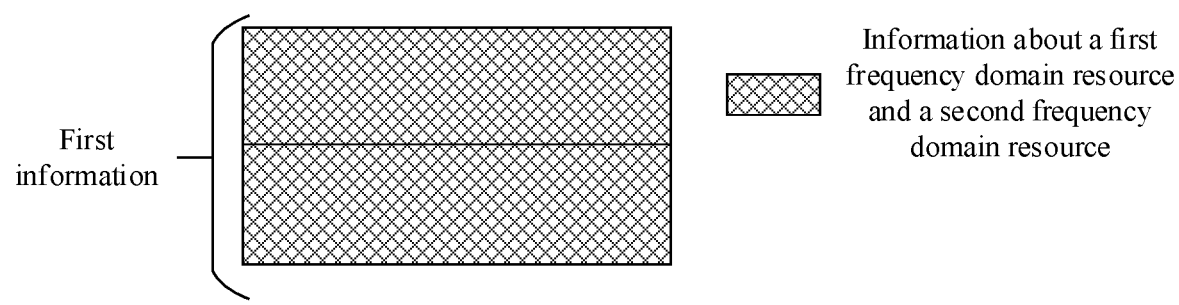
FIG. 4B is another schematic diagram of first information according to one embodiment.

For another example, first information shown in FIG. 4B is used as an example. The first information includes one field. The field includes the information about the first frequency domain resource and the information about the second frequency domain resource. The terminal may obtain the information about the first frequency domain resource and the information about the second frequency domain resource by using the field, to determine the first frequency domain resource and the second frequency domain resource. For example, the first information may be included in an RAR grant field shown in Table 1B. For example, the first frequency domain resource and the second frequency domain resource are indicated by Msg3 physical uplink shared channel frequency domain resource allocation0&1 (Msg3 PUSCH frequency resource allocation0&1) in Table 1B, and Msg3 PUSCH frequency resource allocation0&1 may be understood as the information related to the first frequency domain resource and the information related to the second frequency domain resource. In some embodiments, Table 2B is used as an example. The random access response may further include an indicator (Indicator), indicating whether Msg3 PUSCH frequency resource allocation0&1 in the random access response carries the information about the second frequency domain resource.

TABLE 1B

RAR grant field

...
Msg3 PUSCH frequency resource allocation0&1
...

TABLE 2B

RAR grant field

...
Msg3 PUSCH frequency resource allocation0&1
Indicator
...

In another implementation, the information related to the first frequency domain resource is information indicating the first frequency domain resource, and the information related to the second frequency domain resource is information indicating to obtain the second frequency domain resource based on the first frequency domain resource and with reference to a predefined or configured rule.

For example, Table 3 is used as an example, and the first information may be included in an RAR grant field shown in Table 3. For example, the first frequency domain resource is indicated by Msg3 PUSCH frequency resource allocation0 in Table 3, and Msg3 PUSCH frequency resource allocation0 may be understood as the information related to the first frequency domain resource. The second frequency domain resource is indicated by Msg3 physical uplink shared channel frequency domain resource allocation1 offset (Msg3 PUSCH frequency resource allocation1 offset) in Table 3. Msg3 PUSCH frequency resource allocation1 offset indicates an offset of the second frequency domain resource relative to the first frequency domain resource, and Msg3 PUSCH frequency resource allocation1 offset may be understood as the information related to the second frequency domain resource. The terminal may obtain the second frequency domain resource based on the first frequency domain resource indicated by Msg3 PUSCH frequency resource allocation0 and the offset indicated by Msg3 PUSCH frequency resource allocation1 offset. It may be understood that "the second frequency domain resource is determined based on the first frequency domain resource and the offset" in this example may be understood as an example implementation of the foregoing predefined or configured rule. In some embodiments, Table 4 is used as an example. The random access response may further include an indicator (Indicator), indicating whether Msg3 PUSCH frequency resource allocation1 offset exists in the random access response.

TABLE 3

RAR grant field
. . .
Msg3 PUSCH frequency resource allocation0
Msg3 PUSCH frequency resource allocation1 offset
. . .

TABLE 4

RAR grant field
. . .
Msg3 PUSCH frequency resource allocation0
Msg3 PUSCH frequency resource allocation1 offset
Indicator
. . .

For another example, Table 5 is used as an example, and the first information may be included in an RAR grant field shown in Table 5. For example, the first frequency domain resource is indicated by Msg3 physical uplink shared channel frequency domain resource allocation (Msg3 PUSCH frequency resource allocation) in Table 5, and Msg3 PUSCH frequency resource allocation may be understood as the foregoing information related to the first frequency domain resource. The second frequency domain resource is determined based on Msg3 PUSCH frequency resource allocation in Table 5 and with reference to a predefined or configured frequency hopping rule, and the terminal may obtain the second frequency domain resource based on the first frequency domain resource indicated by Msg3 PUSCH frequency resource allocation and with reference to the predefined or configured frequency hopping rule. The random access response shown in Table 5 may further include an indicator (Indicator), used to indicate whether to determine the second frequency domain resource with reference to the predefined or configured frequency hopping rule. The indicator may be understood as the information related to the second frequency domain resource. In some embodiments, Table 6 is used as an example. The random access response shown in Table 6 may alternatively not include the indicator. In other words, it indicates that the terminal always needs to execute the frequency hopping rule, and no additional indication information needs to be used for indication. It may be understood that "the predefined or configured frequency hopping rule" in this example may be understood as an example implementation of the predefined or configured rule.

TABLE 5

RAR grant field
. . .
Msg3 PUSCH frequency resource allocation
Indicator
. . .

TABLE 6

RAR grant field
. . .
Msg3 PUSCH frequency resource allocation
. . .

It may be understood that the predefined or configured rule may be a predefined rule or a rule (for example, a frequency hopping rule or an offset rule) configured by the network device for the terminal. The terminal may determine the second frequency domain resource based on the rule and the first frequency domain resource. In some embodiments, the predefined or configured rule may be configured by using RRC signaling, indicated in a random access response, or predefined.

In some embodiments, a time domain resource corresponding to the second frequency domain resource may be the same as or different from a time domain resource corresponding to the first frequency domain resource. This is not limited in this embodiment. The time domain resource may be indicated in a random access response (for example, the RAR grant field), or may be predefined. It may be understood that when the time domain resource corresponding to the second frequency domain resource is different from the time domain resource corresponding to the first frequency domain resource, the second frequency domain resource may be the same as or different from the first frequency domain resource. This is not limited in this embodiment. It should be noted that the time domain resource in this embodiment may include at least one frame, at least one half-frame, at least one subframe, at least one slot, at least one time domain symbol, or the like in terms of time.

In some embodiments, the terminal may receive fifth information sent by the network device. The fifth information is used to configure whether the terminal needs to determine the second frequency domain resource by using the predefined or configured rule, and the terminal determines, based on the fifth information, whether to determine the second frequency domain resource by using the foregoing rule. Alternatively, the fifth information is used to configure whether the terminal needs to use the second frequency domain resource, and the terminal determines, based on the fifth information, whether to use the second frequency domain resource. For example, with reference to the example shown in FIG. 4C, if the terminal determines, based on the fifth information, that the terminal needs to determine the second frequency domain resource by using the predefined or configured rule and with reference to the first frequency domain resource, the terminal determines the second frequency domain resource according to the rule, and the first frequency domain resource determined based on the first information shown in FIG. 4C. In some embodiments, if the terminal determines, based on the fifth information, that the terminal does not need to determine the second frequency domain resource by using the rule and with reference to the first frequency domain resource (which may be understood as that the second frequency domain resource does not need to be used), the terminal determines the first frequency domain resource based on the first information shown in FIG. 4C. For example, the fifth information may be included in downlink control information (DCI), a connection release message, a random access response, or a broadcast message.

Figure 4C:
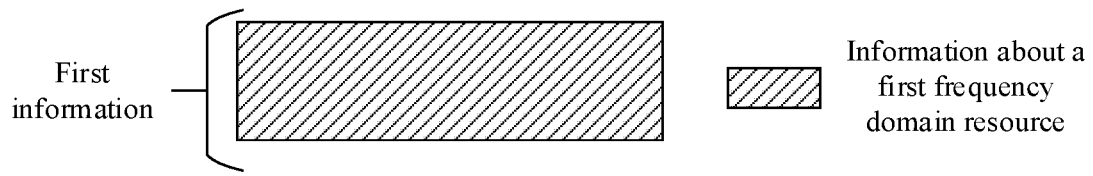
FIG. 4C is still another schematic diagram of first information according to one embodiment.

It may be understood that lengths, distribution, and arrangement of the fields shown in FIG. 4A, FIG. 4B, FIG. 4C, Table 1A, Table 1B, Table 2A, Table 2B, Table 3, Table 4, Table 5, and Table 6 are merely used as examples, and the lengths, distribution, and arrangement of the fields included in the first information are not limited in this embodiment. In addition, it may be understood that Table 1A, Table 1B, Table 2A, Table 2B, Table 3, Table 4, Table 5, and Table 6 show only fields related to this embodiment, and there may be another field in the shown tables. This is not limited in this embodiment.

In an implementation of operation 310, the first frequency domain resource is different from the second frequency domain resource. FIG. 5A, FIG. 5B, FIG. 5C, and FIG. 5D schematically provide several examples in which the first frequency domain resource is different from the second frequency domain resource. In FIG. 5A, FIG. 5B, FIG. 5C, and FIG. 5D, each numbered block may be understood as one frequency domain resource unit. For example, the frequency domain resource unit may be one or more resource blocks (Resource Block), or may be one or more subcarriers. It may be understood that, that the first frequency domain resource is different from the second frequency domain resource may be understood as that the first frequency domain resource and the second frequency domain resource have at least one different frequency domain resource unit.

Figure 5A:
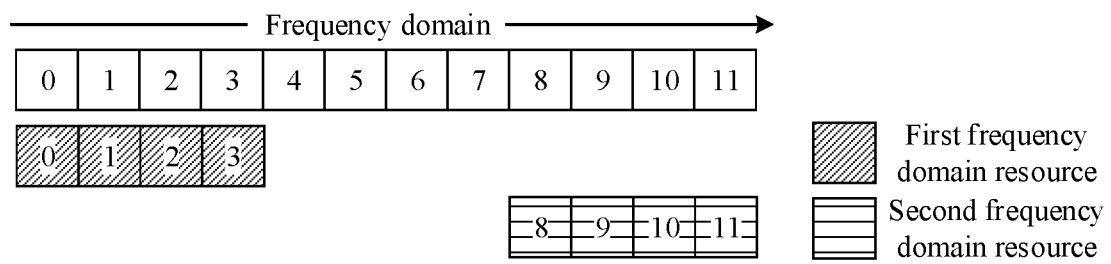
FIG. 5A is a schematic diagram of a first frequency domain resource and a second frequency domain resource according to one embodiment.

In an example shown in FIG. 5A, the first frequency domain resource includes frequency domain resource units 0, 1, 2, and 3, and the second frequency domain resource includes frequency domain resource units 8, 9, 10, and 11. That the first frequency domain resource and the second frequency domain resource have no overlapping frequency domain resource unit in frequency domain may be understood as that the first frequency domain resource is different from the second frequency domain resource.

Figure 5B:
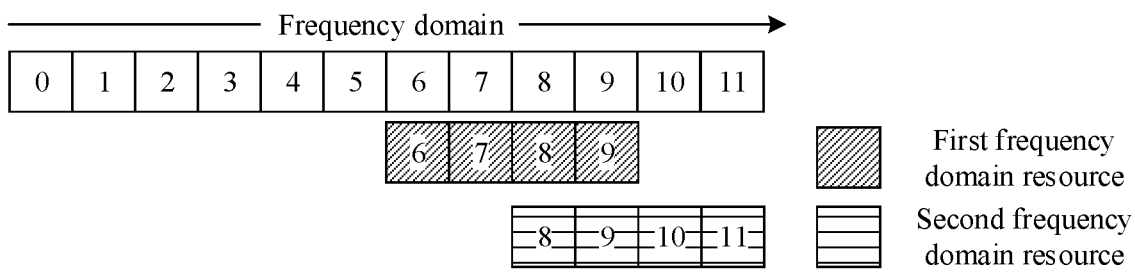
FIG. 5B is another schematic diagram of a first frequency domain resource and a second frequency domain resource according to one embodiment.

In an example shown in FIG. 5B, the first frequency domain resource includes frequency domain resource units 6, 7, 8, and 9, and the second frequency domain resource includes frequency domain resource units 8, 9, 10, and 11. That the first frequency domain resource and the second frequency domain resource have a partially overlapping frequency domain resource unit in frequency domain may be understood as that the first frequency domain resource is different from the second frequency domain resource.

Figure 5C:
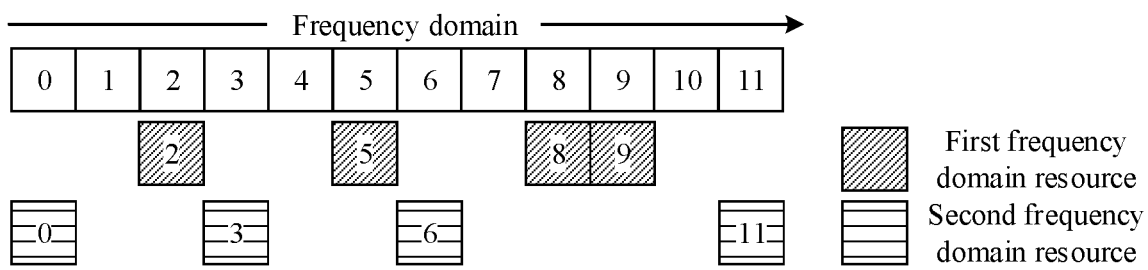
FIG. 5C is still another schematic diagram of a first frequency domain resource and a second frequency domain resource according to one embodiment.

In an example shown in FIG. 5C, the first frequency domain resource includes frequency domain resource units 2, 5, 8, and 9, and the second frequency domain resource includes frequency domain resource units 0, 3, 6, and 11. That the first frequency domain resource and the second frequency domain resource have no overlapping frequency domain resource unit in frequency domain may be understood as that the first frequency domain resource is different from the second frequency domain resource.

Figure 5D:
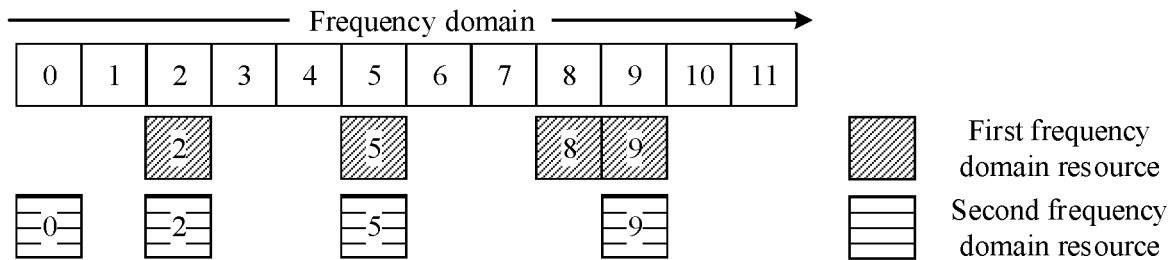
FIG. 5D is yet another schematic diagram of a first frequency domain resource and a second frequency domain resource according to one embodiment.

In an example shown in FIG. 5D, the first frequency domain resource includes frequency domain resource units 2, 5, 8, and 9, and the second frequency domain resource includes frequency domain resource units 0, 2, 5, and 9. That the first frequency domain resource and the second frequency domain resource have a partially overlapping frequency domain resource unit in frequency domain may be understood as that the first frequency domain resource is different from the second frequency domain resource.

It may be understood that the first frequency domain resource and the second frequency domain resource shown in FIG. 5A, FIG. 5B, FIG. 5C, and FIG. 5D are merely examples. Specific allocation of the first frequency domain resource and the second frequency domain resource is not limited in this embodiment.

In operation 320 and operation 330, the terminal sends the uplink information by using the first frequency domain resource, and sends the uplink information by using the second frequency domain resource. In some embodiments, with reference to the foregoing feature that the first frequency domain resource is different from the second frequency domain resource, the terminal may send the uplink information on different frequency domain resources, so that a frequency domain selective gain can be obtained, and reliability of transmission of the uplink information can be improved, thereby reducing a delay in connection resumption, connection establishment, or connection reestablishment.

It may be understood that a sequence of performing operation 320 and operation 330 is not limited in this embodiment. For example, operation 320 may be performed before operation 330, operation 330 may be performed before operation 320, or operation 320 and operation 330 may be performed at the same time.

In an implementation of operation 310, the first information includes information about M frequency domain resources, where M is an integer greater than 2; and the terminal determines the first frequency domain resource and the second frequency domain resource based on the information about the M frequency domain resources. In this implementation, a probability of a resource conflict can be reduced when the terminal sends the uplink information on a shared frequency domain resource.

In some embodiments, the terminal may randomly determine the first frequency domain resource and the second frequency domain resource in the M frequency domain resources indicated by the information about the M frequency domain resources.

In some embodiments, the terminal may determine, based on an identifier of the terminal, the first frequency domain resource and the second frequency domain resource in the M frequency domain resources indicated by the information about the M frequency domain resources. In a implementation, the terminal may select a $(UEID\ MOD\ M)^{th}$ resource from the M frequency domain resources as the first frequency domain resource, and select a $((UEID\ MOD\ M+1)\ MOD\ M)^{th}$ resource from the M frequency domain resources as the second frequency domain resource, where UEID is the identifier of the terminal. In another implementation, the terminal may select an $f1(UEID)f1(UEID)^{th}$ resource from the M frequency domain resources as the first frequency domain resource, and select an f2(UEID)$^{th}$ resource from the M frequency domain resources as the second frequency domain resource, where UEID is the identifier of the terminal, and f1(UEID) and f2(UEID) respectively represent two functions including UEID as an input.

In some embodiments, the terminal may determine, based on a cause for a connection request, to select the first frequency domain resource and the second frequency domain resource from the M frequency domain resources indicated by the information about the M frequency domain resources. The connection request may be a connection resumption request, a connection establishment request, or a connection reestablishment request.

In an example implementation of the determining, based on a cause for a connection request, the first frequency domain resource and the second frequency domain resource in the M frequency domain resources indicated by the information about the M frequency domain resources, the terminal determines to select the first frequency domain resource and the second frequency domain resource from the M frequency domain resources based on a cause for the connection resumption request. For example, when the terminal determines that the cause for the connection resumption request is an emergency call, high-priority access, mobile terminated access, mobile originated signaling, mobile originated data, a mobile originated voice, a wireless network area update, delay tolerant access, a mobile originated video, or a mobile originated short message service message, or the connection resumption request is triggered by a 5G quality of service identifier (5G QoS Identifier, 5QI), the terminal needs to select the first frequency domain resource and the second frequency domain resource from the M frequency domain resources.

In an example implementation of the determining, based on a cause for a connection request, the first frequency domain resource and the second frequency domain resource in the M frequency domain resources indicated by the information about the M frequency domain resources, the terminal determines to select the first frequency domain resource and the second frequency domain resource from the M frequency domain resources based on a cause for the connection establishment request. For example, when the terminal determines that the cause for the connection establishment request is an emergency call, high-priority access, mobile terminated access, mobile originated signaling, mobile originated data, a mobile originated voice, a wireless network area update, delay tolerant access, a mobile originated video, or a mobile originated short message service message, or the connection establishment request is triggered by a 5G quality of service identifier (5QI), the terminal needs to select the first frequency domain resource and the second frequency domain resource from the M frequency domain resources.

In an example implementation of the determining, based on a cause for a connection request, the first frequency domain resource and the second frequency domain resource in the M frequency domain resources indicated by the information about the M frequency domain resources, the terminal determines to select the first frequency domain resource and the second frequency domain resource from the M frequency domain resources based on a cause for the connection reestablishment request. For example, when the terminal determines that the cause for the connection reestablishment request is a reconfiguration failure, a handover failure, an emergency call, high-priority access, mobile terminated access, mobile originated signaling, mobile originated data, a mobile originated voice, a wireless network area update, delay tolerant access, a mobile originated video, or a mobile originated short message service message, or the connection reestablishment request is triggered by a 5G quality of service identifier (5G QoS Identifier, 5QI), the terminal needs to select the first frequency domain resource and the second frequency domain resource from the M frequency domain resources.

In some embodiments, the terminal may determine, based on the cause for the connection request configured by the network device, to select the first frequency domain resource and the second frequency domain resource from the M frequency domain resources indicated by the information about the M frequency domain resources. For example, the network device may configure the following case for the terminal: When the cause for the connection request is an emergency call and high-priority access, the terminal needs to select the first frequency domain resource and the second frequency domain resource from the M frequency domain resources indicated by the information about the M frequency domain resources. For another example, a 5QI shown in Table 7 is used as an example. The network device may configure the following case for the terminal: When 5QI index values in Table 7 are 2 and 5 (that is, service types are a service type 2 and a service type 5), the terminal needs to select the first frequency domain resource and the second frequency domain resource from the M frequency domain resources indicated by the information about the M frequency domain resources.

TABLE 7

| 5QI index value | Service Type |
| --- | --- |
| 1 | Service type 1 (for example, a voice service) |
| 2 | Service type 2 (for example, an internet of vehicles service) |
| 3 | Service type 3 (for example, a video service) |
| 4 | Service type 4 (for example, a game service) |
| 5 | Service type 5 (for example, a low-latency and high-reliability service) |
| . . . | . . . |

In some embodiments, a higher layer (for example, an RRC layer) of the terminal indicates a lower layer (for example, a MAC layer) of the terminal to determine the first frequency domain resource and the second frequency domain resource in the M frequency domain resources indicated by the information about the M frequency domain resources. In some embodiments, a higher layer (for example, an RRC layer) of the terminal may indicate, based on the cause for the connection request, a lower layer (for example, a MAC layer) of the terminal to determine the first frequency domain resource and the second frequency domain resource in the M frequency domain resources indicated by the information about the M frequency domain resources. For the cause for the connection request, refer to the cause for the connection resumption request, the cause for the connection establishment request, and the cause for the connection reestablishment request. Details are not described herein again.

In another implementation of operation 300 and operation 310, the first information may be carried in the physical random access channel configuration information sent by the network device. The terminal receives the physical random access channel configuration information sent by the network device and obtains a physical random access channel configuration. The physical random access channel configuration is used to configure the time domain resource, the frequency domain resource, and the format of the random access preamble. The terminal determines the first frequency domain resource and the second frequency domain resource based on the physical random access channel configuration. The physical random access channel configuration corresponds to the first frequency domain resource and the second frequency domain resource. For example, the terminal determines the first frequency domain resource and the second frequency domain resource based on one or more of the time domain resource, the frequency domain resource, or the format of the random access preamble. For example, the correspondence between the physical random access channel configuration and the first frequency domain resource and the second frequency domain resource may be predefined, or may be configured by the network device for the terminal. It may be understood that the physical random access channel configuration may be carried by one piece of information, or a plurality of pieces of information. That is, the physical random access channel configuration information may be one piece of information or a plurality of pieces of information. In the foregoing implementation, the network may determine, based on a random access channel (random access channel, RACH) request, whether to allocate a plurality of frequency domain resources to the terminal, to avoid allocating a plurality of frequency domain resources to an unnecessary user, thereby improving resource use efficiency.

In some embodiments, the time domain resource of the random access preamble corresponds to the first frequency domain resource and the second frequency domain resource; and the terminal determines the first frequency domain resource and the second frequency domain resource based on the time domain resource of the random access preamble.

In some embodiments, the frequency domain resource of the random access preamble corresponds to the first frequency domain resource and the second frequency domain resource; and the terminal determines the first frequency domain resource and the second frequency domain resource based on the frequency domain resource of the random access preamble.

In some embodiments, the format of the random access preamble corresponds to the first frequency domain resource and the second frequency domain resource; and the terminal determines the first frequency domain resource and the second frequency domain resource based on the format of the random access preamble.

In some embodiments, the time domain resource and the format of the random access preamble correspond to the first frequency domain resource and the second frequency domain resource; and the terminal determines the first frequency domain resource and the second frequency domain resource based on the time domain resource and the format of the random access preamble.

A correspondence between the time domain resource and the format of the random access preamble and the first frequency domain resource and the second frequency domain resource shown in Table 8 is used as an example. For example, a RACH configuration index in Table 8 is 0. It is configured that the time domain resource of the random access preamble is a time domain resource 0, and the format of the random access preamble is a format 0. Based on the correspondence between the time domain resource and the format of the random access preamble and the first frequency domain resource and the second frequency domain resource shown in Table 8, the first frequency domain resource and the second frequency domain resource that correspond to the time domain resource 0 of the random access preamble and the format 0 of the random access preamble are F10 and F20. The terminal determines the first frequency domain resource F10 and the second frequency domain resource F20 based on the time domain resource 0 and the format 0 of the random access preamble. For another example, a RACH configuration index in Table 8 is 1. It is configured that the time domain resource of the random access preamble is a time domain resource 1, and the format of the random access preamble is a format 0. Based on the correspondence between the time domain resource and the format of the random access preamble and the first frequency domain resource and the second frequency domain resource shown in Table 8, the first frequency domain resource and the second frequency domain resource that correspond to the time domain resource 1 of the random access preamble and the format 0 of the random access preamble are F11 and F21. The terminal determines the first frequency domain resource F11 and the second frequency domain resource F21 based on the time domain resource 1 and the format 0 of the random access preamble. For still another example, a RACH configuration index in Table 8 is 2. It is configured that the time domain resource of the random access preamble is a time domain resource 0, and the format of the random access preamble is a format 1. Based on the correspondence between the time domain resource and the format of the random access preamble and the first frequency domain resource and the second frequency domain resource shown in Table 8, the first frequency domain resource and the second frequency domain resource that correspond to the time domain resource 0 of the random access preamble and the format 1 of the random access preamble are F12 and F22. The terminal determines the first frequency domain resource F12 and the second frequency domain resource F22 based on the time domain resource 0 and the format 1 of the random access preamble.

TABLE 8

| RACH configuration index | Time domain resource of a random access preamble | Format of the random access preamble | First frequency domain resource and second frequency domain resource |
|---|---|---|---|
| 0 | Time domain resource 0 | Format 0 | F10 and F20 |
| 1 | Time domain resource 1 | Format 0 | F11 and F21 |
| 2 | Time domain resource 0 | Format 1 | F12 and F22 |
| ... | ... | ... | ... |

Further, a correspondence between the time domain resource and the format of the random access preamble and the first frequency domain resource shown in Table 9 is used as an example. For example, a RACH configuration index in Table 9 is 0. It is configured that the time domain resource of the random access preamble is a time domain resource 0, and the format of the random access preamble is a format 0. Based on the correspondence between the time domain resource and the format of the random access preamble and the first frequency domain resource shown in Table 9, the first frequency domain resource corresponding to the time domain resource 0 of the random access preamble and the format 0 of the random access preamble is F10. The terminal determines the first frequency domain resource F10 based on the time domain resource 0 and the format 0 of the random access preamble, and the terminal obtains a second frequency domain resource F20 based on the first frequency domain resource F10 and with reference to a predefined or configured rule. For another example, a RACH configuration index in Table 9 is 1. It is configured that the time domain resource of the random access preamble is a time domain resource 1, and the format of the random access preamble is a format 0. Based on the correspondence between the time domain resource and the format of the random access preamble and the first frequency domain resource shown in Table 9, the first frequency domain resource corresponding to the time domain resource 1 of the random access preamble and the format 0 of the random access preamble is F11. The terminal determines the first frequency domain resource F11 based on the time domain resource 1 and the format 0 of the random access preamble, and the terminal obtains a second frequency domain resource F21 based on the first frequency domain resource F11 and with reference to a predefined or configured rule. For still another example, a RACH configuration index in Table 9 is 2. It is configured that the time domain resource of the random access preamble is a time domain resource 0, and the format of the random access preamble is a format 1. Based on the correspondence between the time domain resource and the format of the random access preamble and the first frequency domain resource shown in Table 9, the first frequency domain resource corresponding to the time domain resource 0 of the random access preamble and the format 1 of the random access preamble is F12. The terminal determines the first frequency domain resource F12 based on the time domain resource 0 and the format 1 of the random access preamble, and the terminal obtains a second frequency domain resource F22 based on the first frequency domain resource F12 and with reference to a predefined or configured rule. For the predefined or configured rule and a specific implementation method for obtaining the second frequency domain resource based on the first frequency domain resource and with reference to the predefined or configured rule, refer to the related descriptions of Table 3, Table 4, Table 5, and Table 6 in this embodiment. Details are not described herein again.

TABLE 9

| RACH configuration index | Time domain resource of a random access preamble | Format of the random access preamble | First frequency domain resource |
|---|---|---|---|
| 0 | Time domain resource 0 | Format 0 | F10 |
| 1 | Time domain resource 1 | Format 0 | F11 |
| 2 | Time domain resource 0 | Format 1 | F12 |
| ... | ... | ... | ... |

In some embodiments, the time domain resource and the frequency domain resource of the random access preamble correspond to the first frequency domain resource and the second frequency domain resource; and the terminal determines the first frequency domain resource and the second frequency domain resource based on the time domain resource and the frequency domain resource of the random access preamble. For a detailed implementation, refer to the related descriptions of Table 8 and Table 9 in this embodiment. Details are not described herein again.

In some embodiments, the frequency domain resource and the format of the random access preamble correspond to the first frequency domain resource and the second frequency domain resource; and the terminal determines the first frequency domain resource and the second frequency domain resource based on the frequency domain resource and the format of the random access preamble. For a detailed implementation, refer to the related descriptions of Table 8 and Table 9 in this embodiment. Details are not described herein again.

In some embodiments, the time domain resource, the frequency domain resource, and the format of the random access preamble correspond to the first frequency domain resource and the second frequency domain resource; and the terminal determines the first frequency domain resource and the second frequency domain resource based on the time domain resource, the frequency domain resource, and the format of the random access preamble. For a detailed implementation, refer to the related descriptions of Table 8 and Table 9 in this embodiment. Details are not described herein again.

In another implementation of operation 300 and operation 310, the first information may be carried in a random access response, the terminal receives the random access response, and the random access response includes information indicating the first frequency domain resource and information indicating the second frequency domain resource; and the terminal determines the first frequency domain resource and the second frequency domain resource based on the information indicating the first frequency domain resource and the information indicating the second frequency domain resource.

Figure 6A:
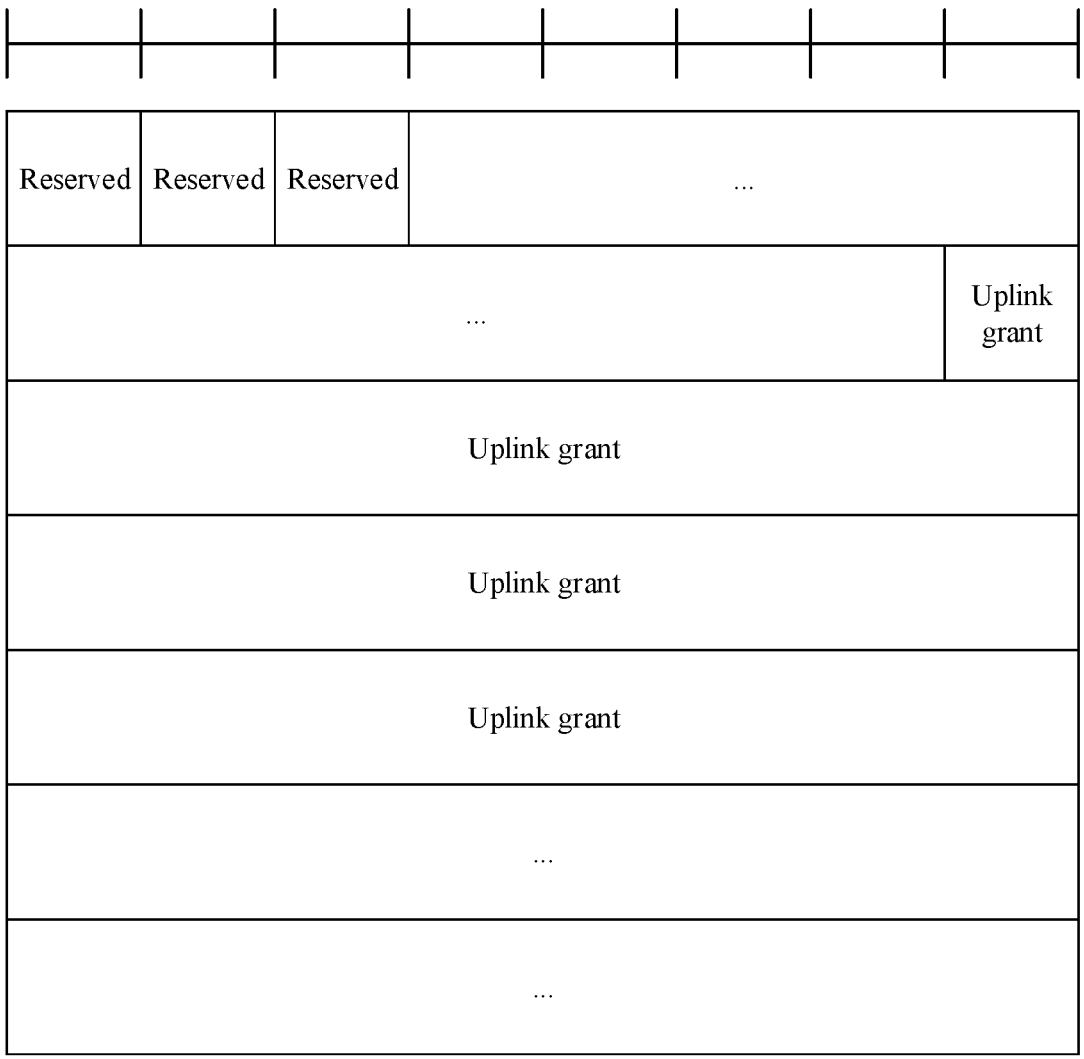
FIG. 6A is a schematic diagram of a random access response according to one embodiment.

In some embodiments, content included in a random access response shown in FIG. 6A is used as an example. A field shown as "uplink grant" includes information about the first frequency domain resource and the second frequency domain resource. In other words, the information about the first frequency domain resource and the second frequency domain resource is carried in one field of the random access response. The terminal may obtain the content of the "uplink grant" field, to obtain the information about the first frequency domain resource and the second frequency domain resource, to determine the first frequency domain resource and the second frequency domain resource.

Figure 6B:
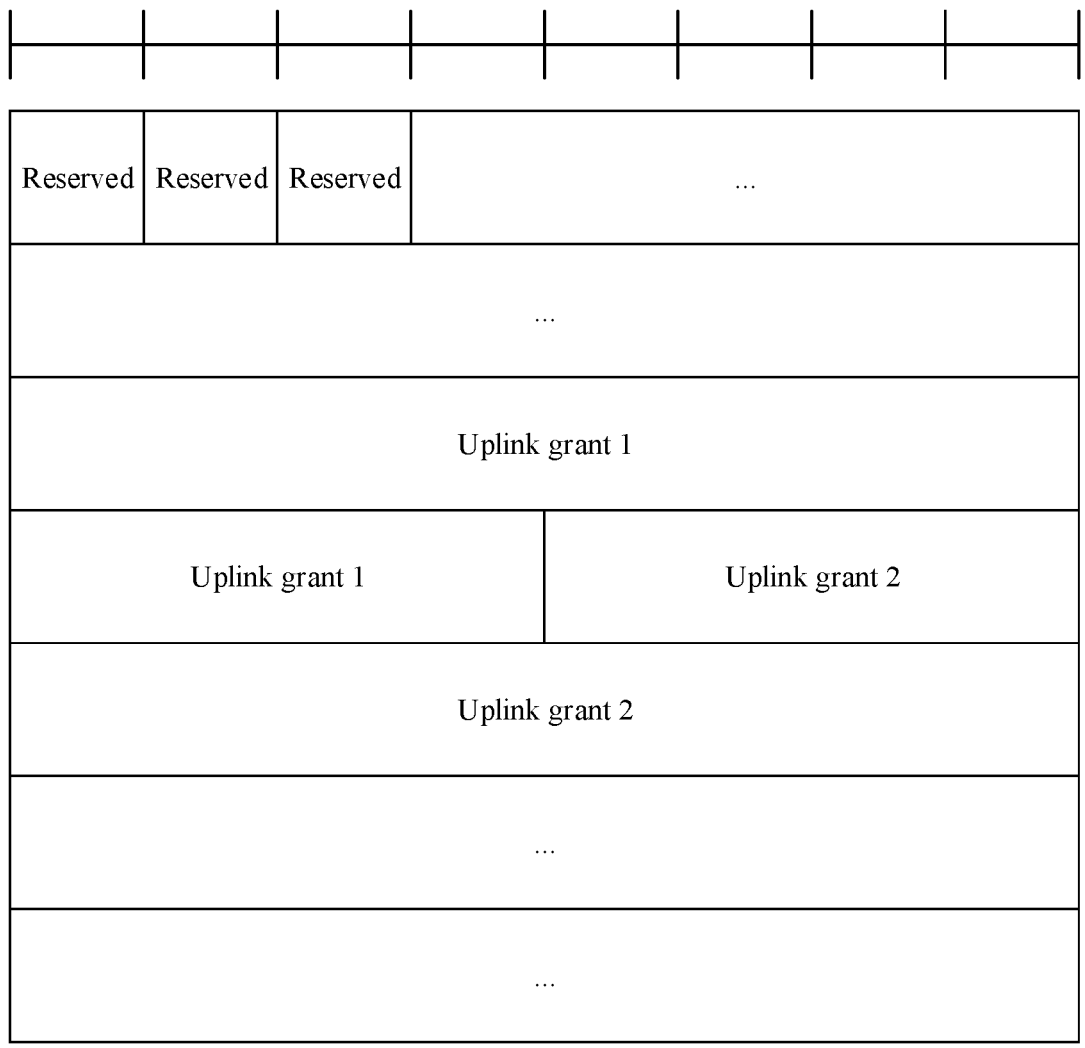
FIG. 6B is another schematic diagram of a random access response according to one embodiment.

In some embodiments, content included in a random access response shown in FIG. 6B is used as an example. A field shown as "uplink grant 1" includes information about the first frequency domain resource and a field shown as "uplink grant 2" includes information about the second frequency domain resource. In other words, the information about the first frequency domain resource and the information about the second frequency domain resource are respectively carried in two fields of the random access response. The terminal may obtain the content of the "uplink grant 1" field, to obtain the information about the first frequency domain resource, to further determine the first frequency domain resource. The terminal may obtain the content of the "uplink grant 2" field, to obtain the information about the second frequency domain resource, to further determine the second frequency domain resource. In some embodiments, a "reserved" field in FIG. 6B may be used to indicate whether there is an "uplink grant 2" field.

It may be understood that lengths, distribution, arrangement, and quantities of the fields carried in the random access responses shown in FIG. 6A and FIG. 6B are merely used as examples, and the lengths, distribution, arrangement, and quantities of the fields included in the random access responses are not limited in this embodiment. In addition, it may be understood that FIG. 6A and FIG. 6B show only fields related to this embodiment, and there may be another field in the random access responses shown in FIG. 6A and FIG. 6B. This is not limited in this embodiment.

In an implementation of operation 320 and operation 330, the terminal may send the uplink information by using the first frequency domain resource and the second frequency domain resource under a condition.

Figure 7A:
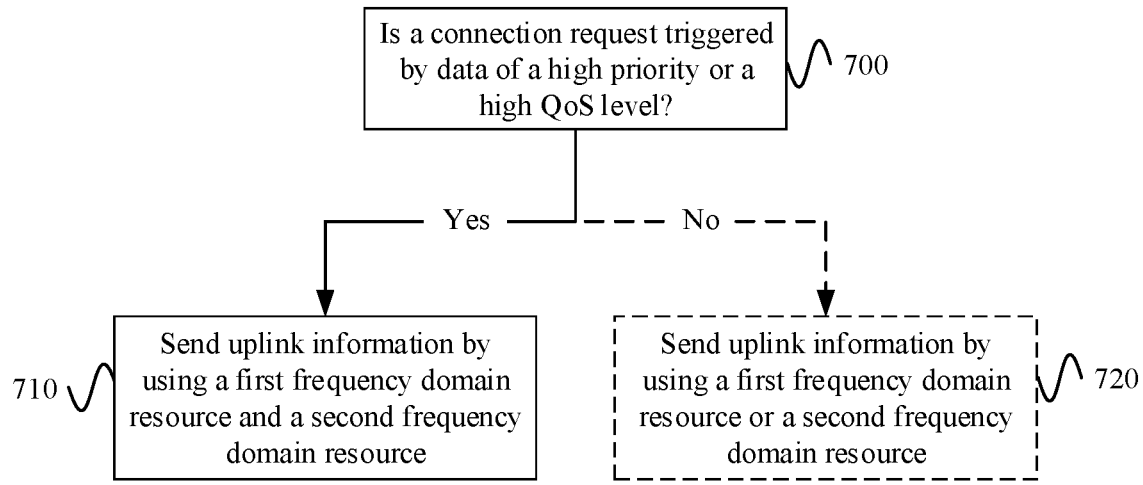
FIG. 7A is a schematic flowchart of sending uplink information by using two frequency domain resources according to one embodiment.

In some embodiments, the terminal may determine, based on the cause for the connection request, whether to send the uplink information by using the first frequency domain resource, and send the uplink information by using the second frequency domain resource. A flowchart shown in FIG. 7A is used as an example. In some embodiments, if the connection request is triggered by data of a high priority or a high quality of service (QoS) level, for example, the data of a high priority or a high QoS level may be non-access stratum (NAS) signaling or URLLC data, the terminal determines to send the uplink information by using the first frequency domain resource and the second frequency domain resource. In some embodiments, if the connection request is not triggered by data of a high priority or a high QoS level, the terminal may send the uplink information by using the first frequency domain resource or the second frequency domain resource.

It may be understood that the connection request is the connection resumption request, the connection establishment request, or the connection reestablishment request, and the cause for the connection request may be the cause for the connection resumption request, the cause for the connection establishment request, or the cause for the connection reestablishment request. For details, refer to the descriptions of the cause for the connection resumption request, the cause for the connection establishment request, and the cause for the connection reestablishment request described above. Details are not described herein again.

In some embodiments, the terminal may determine, based on a cause for a connection request configured by the network device, whether to send the uplink information by using the first frequency domain resource, and send the uplink information by using the second frequency domain resource. For example, the network device may configure the following case for the terminal: When the cause for the connection request is an emergency call and high-priority access, the terminal needs to send the connection resumption request, the connection establishment request, or the connection reestablishment request by using the first frequency domain resource and the second frequency domain resource. For another example, a 5QI shown in Table 7 is used as an example. The network device may configure the following case for the terminal: When 5QI index values in Table 7 are 2 and 5 (that is, service types are a service type 2 and a service type 5), the terminal needs to send the connection resumption request, the connection establishment request, or the connection reestablishment request by using the first frequency domain resource and the second frequency domain resource.

Figure 7B:
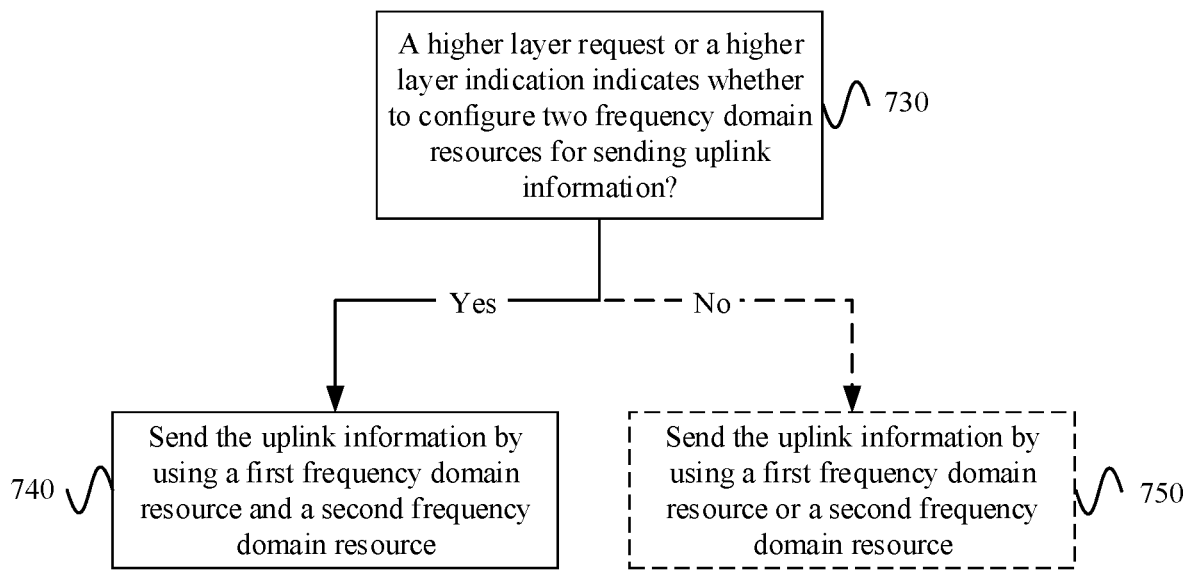
FIG. 7B is another schematic flowchart of sending uplink information by using two frequency domain resources according to one embodiment.

In some embodiments, the terminal may determine, based on a higher layer indication or a higher layer request, whether to send the uplink information by using the first frequency domain resource, and send the uplink information by using the second frequency domain resource. It may be understood that the higher layer indication or the higher layer request may be understood as that a protocol layer higher layer (for example, a NAS layer or an RRC layer) of the terminal indicates or requests a protocol layer lower layer (for example, a MAC layer or an RLC layer) of the terminal. A flowchart shown in FIG. 7B is used as an example. In some embodiments, if a higher layer request or a higher layer indication configures to send the uplink information by using two frequency domain resources, the terminal sends the uplink information by using the first frequency domain resource and the second frequency domain resource. In some embodiments, if a higher layer request or a higher layer indication does not configure to send the uplink information by using two frequency domain resources, the terminal sends the uplink information by using the first frequency domain resource or the second frequency domain resource. It may be understood that the uplink information to be sent by the higher layer indication or the higher layer request by using the first frequency domain resource and the second frequency domain resource may be generally understood as data including a high priority or a high QoS level. For example, the uplink information may be NAS signaling or URLLC data.

Figure 7C:
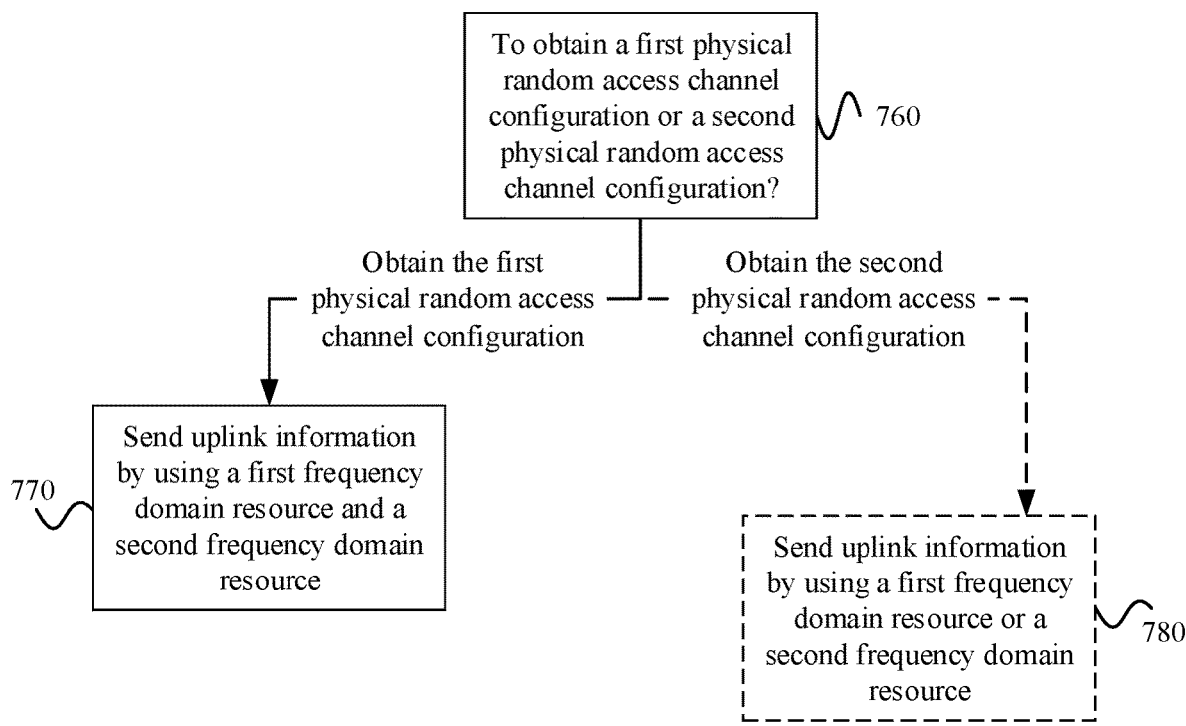
FIG. 7C is another schematic flowchart of sending uplink information by using two frequency domain resources according to one embodiment.

In some embodiments, the terminal may determine, based on a physical random access channel configuration, whether to send the uplink information by using the first frequency domain resource, and send the uplink information by using the second frequency domain resource. A flowchart shown in FIG. 7C is used as an example. In some embodiments, the terminal obtains a first physical random access channel configuration, where the first physical random access channel configuration is used to configure one or more of a time domain resource, a frequency domain resource, and a format of a first random access preamble, and the terminal determines, based on the first physical random access channel configuration, to send the uplink information by using the first frequency domain resource and the second frequency domain resource. In some embodiments, the terminal obtains a second physical random access channel configuration, where the second physical random access channel configuration is used to configure one or more of a time domain resource, a frequency domain resource, and a format of a second random access preamble, and the terminal determines, based on the second physical random access channel configuration, to send the uplink information by using the first frequency domain resource or the second frequency domain resource.

In the foregoing implementations, data of a high priority or a high QoS requirement may be transmitted by using two frequency domain resources, and data of a low priority or a low QoS requirement may be transmitted still by using one frequency domain resource. In this way, reliability of the data of a high priority or a high QoS requirement is ensured, and resource use efficiency is improved.

In some embodiments, if the terminal determines to send the uplink information by using the first frequency domain resource, and send the uplink information by using the second frequency domain resource, the terminal may determine access channel resources associated with the first frequency domain resource and the second frequency domain resource for sending uplink information, and send the random access preamble on the access channel resources. In this implementation, the network device can learn of a frequency domain resource to be used by the terminal, thereby reducing complexity of receiving the uplink information by the network side.

In some embodiments, in operation 320 and operation 330, the first frequency domain resource is used by the terminal to initially transmit the uplink information in a first hybrid automatic repeat request (HARQ) process, and the second frequency domain resource is used by the terminal to retransmit the uplink information in the first HARQ process. In this implementation, same data is transmitted in a same HARQ process, so that a combined gain of the data can be obtained, thereby improving data receiving reliability.

In some embodiments, in operation 320 and operation 330, the first frequency domain resource is used by the terminal to initially transmit the uplink information in a first HARQ process, and the second frequency domain resource is used by the terminal to initially transmit the uplink information in a second HARQ process.

In some embodiments, the uplink information initially transmitted in the first HARQ process and the uplink information initially transmitted in the second HARQ process may correspond to different redundancy versions generated after a MAC protocol data unit (Protocol Data Unit, PDU) is encoded.

In some embodiments, the uplink information initially transmitted in the first HARQ process and the uplink information initially transmitted in the second HARQ process may respectively correspond to two MAC PDUs. To be specific, a first MAC PDU corresponds to the uplink information initially transmitted in the first HARQ process, and a second MAC PDU corresponds to the uplink information initially transmitted in the second HARQ process. The two MAC PDUs respectively correspond to two RLC PDUs. To be specific, a first RLC PDU corresponds to the first MAC PDU, and a second RLC PDU corresponds to the second MAC PDU. The two RLC PDUs respectively correspond to two pieces of RRC information. To be specific, first RRC information corresponds to the first RLC PDU, second RRC information corresponds to the second RLC PDU, and the second RRC information is the same as the first RRC information, that is, the second RRC information is a duplicate or a copy of the first RRC information. In some embodiments, the second RRC information and the first RRC information include a same message number. For example, in a implementation, the uplink information is included in a connection establishment request, a connection resumption request, or a connection reestablishment request. The connection establishment request, the connection resumption request, or the connection reestablishment request further includes the foregoing message number or a message identifier (for example, an RRC transaction identifier (rrc-TransactionIdentifier)). In this implementation, same data is transmitted in different HARQ processes. Because content transmitted in different HARQ processes can be independently decoded, when data in one HARQ process is missed to be detected or is incorrectly detected, data receiving in another HARQ process is not affected, thereby increasing a probability of successfully receiving data.

In some embodiments, in operation 320 and operation 330, the first frequency domain resource and the second frequency domain resource may be used in different bandwidth parts (Bandwidth Part, BWP, which may also be referred to as bandwidth parts), on different carriers, or in different cells.

In some embodiments, the first frequency domain resource is used by the terminal to send the uplink information in a first BWP, and the second frequency domain resource is used by the terminal to send the uplink information in a second BWP.

In some embodiments, the first frequency domain resource is used by the terminal to send the uplink information on a first carrier, and the second frequency domain resource is used by the terminal to send the uplink information on a second carrier.

In some embodiments, the first frequency domain resource is used by the terminal to send the uplink information in a first cell, and the second frequency domain resource is used by the terminal to send the uplink information in a second cell.

In some embodiments, in operation 320 and operation 330, when sending the uplink information by using the first frequency domain resource and the second frequency domain resource, the terminal may further start a corresponding timer, so that the terminal can perform contention-based conflict resolution.

In some embodiments, the terminal sends the uplink information by using the first frequency domain resource, and starts a first timer; and the terminal sends the uplink information by using the second frequency domain resource, and restarts the first timer, where a time domain resource corresponding to the second frequency domain resource is different from a time domain resource corresponding to the first frequency domain resource.

In some embodiments, the terminal sends the uplink information by using the first frequency domain resource, and starts a first timer; and the terminal sends the uplink information by using the second frequency domain resource, and starts a second timer.

In some embodiments, when the terminal receives a correct feedback of the uplink information or receives contention resolution information matching the uplink information, the terminal stops the first timer and/or the second timer. For example, the terminal receives a matched contention resolution MAC control element (CE) or receives a physical downlink control channel scrambled by using an identifier of the terminal. In some embodiments, the identifier of the terminal may be a cell radio network temporary identifier (C-RNTI), a configured scheduling RNTI (CS-RNTI), a configured grant RNTI (CG-RNTI), or a random access RNTI (RA-RNTI).

In some embodiments, if the terminal is in an active state or an inactive state, and the terminal does not receive a correct feedback of the uplink information or does not receive contention resolution information matching the uplink information when the first timer and/or the second timer expires, the terminal releases a context and enters an idle state; or if the terminal is in an idle state, and the terminal does not receive a correct feedback of the uplink information or does not receive contention resolution information matching the uplink information when the first timer and/or the second timer expires, the terminal remains in the idle state.

According to the method provided in this embodiment, at least two frequency domain resources are configured for transmission of the connection resumption request, the connection establishment request, or the connection reestablishment request, and the connection resumption request, the connection establishment request, or the connection reestablishment request is sent by using the at least two frequency domain resources. According to the method, reliability of the transmission of the connection resumption request, the connection establishment request, or the connection reestablishment request can be improved.

Figure 8A:
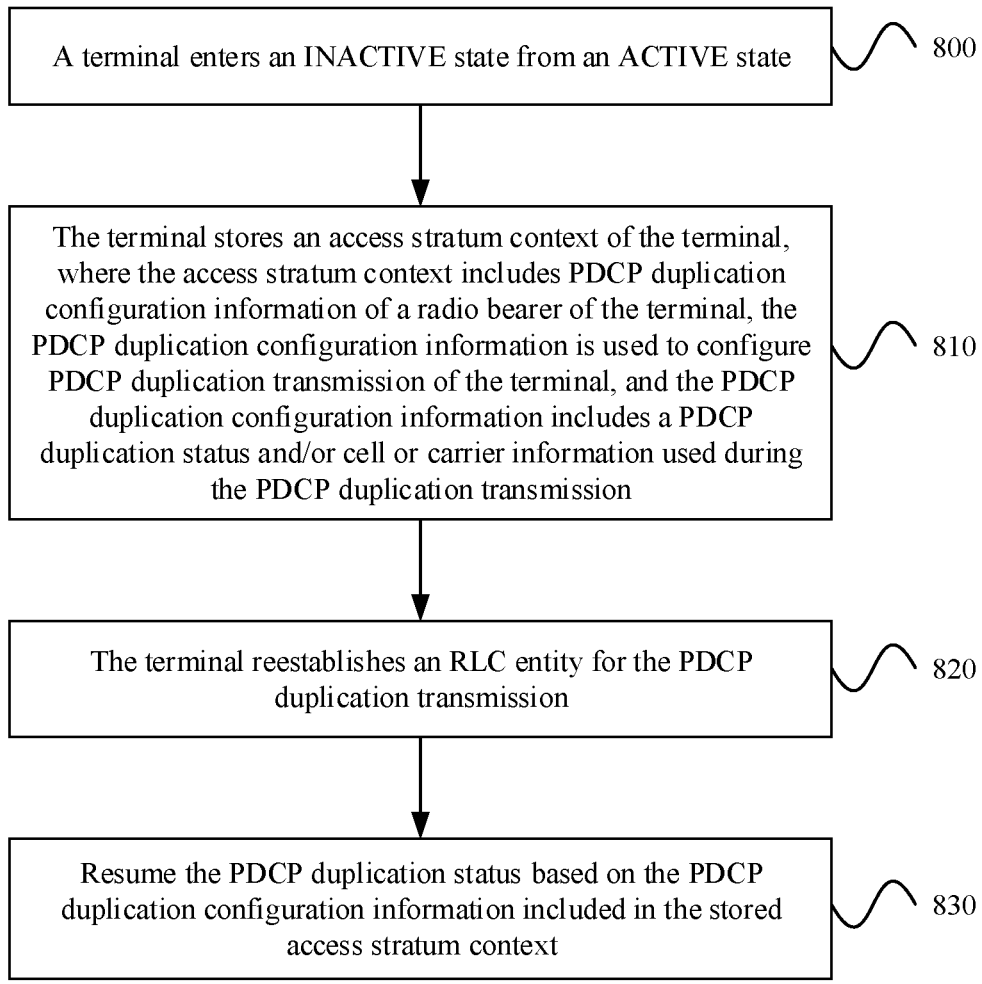
FIG. 8A is a schematic flowchart of a transmission configuration method according to one embodiment.

FIG. 8A is a schematic flowchart of a transmission configuration method according to one embodiment. As shown in FIG. 8A, the method in this embodiment may include the following steps.

Operation 800: A terminal enters an INACTIVE state or an IDLE state from an ACTIVE state.

Operation 810: The terminal stores an access stratum context of the terminal, where the access stratum context includes PDCP duplication configuration information of a radio bearer of the terminal, the PDCP duplication configuration information is used to configure PDCP duplication transmission of the terminal, and the PDCP duplication configuration information includes a PDCP duplication status and/or cell or carrier information used during the PDCP duplication transmission.

Figure 8B:
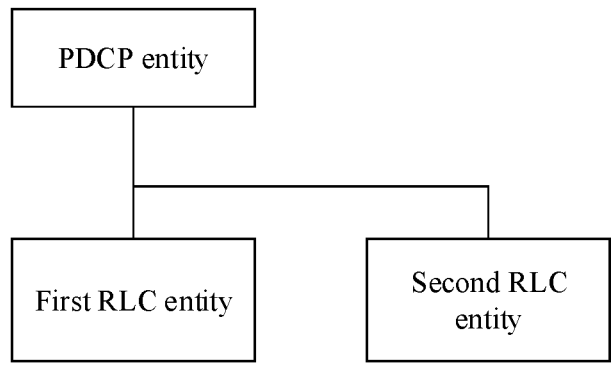
FIG. 8B is a schematic diagram of a protocol stack according to one embodiment.

In some embodiments, the PDCP duplication transmission means that a PDCP entity of a radio bearer generates a PDCP PDU and a duplicate PDCP PDU, and the PDCP entity sends the PDCP PDU to an RLC entity of the radio bearer, and sends the duplicate PDCP PDU to another RLC entity of the radio bearer. Another RLC entity may be understood as an RLC entity for the PDCP duplication transmission. FIG. 8B is used as an example. During the PDCP duplication transmission, a PDCP entity in FIG. 8B generates a first PDCP PDU and a second PDCP PDU. The second PDCP PDU is the same as the first PDCP PDU. In other words, the second PDU is a duplicate PDU of the first PDU. The PDCP entity in FIG. 8B sends the first PDCP PDU to a first RLC entity in FIG. 8B, and sends the second PDCP PDU to a second RLC entity in FIG. 8B. The second RLC entity may be understood as an RLC entity for the PDCP duplication transmission.

In some embodiments, during the PDCP duplication transmission, one radio bearer has at least two logical channels, each logical channel corresponds to an RLC entity, and cells or carriers that can be used by the logical channels do not overlap each other. The cell or carrier information used during the PDCP duplication transmission is cell or carrier information corresponding to each logical channel of a bearer for duplication transmission (which may also be understood as an RLC entity corresponding to each logical channel). FIG. 8B is used as an example. During the PDCP duplication transmission, the terminal may determine, based on the cell information used during the PDCP duplication transmission, a first cell corresponding to the first RLC entity, where the first RLC entity sends the first PDCP PDU by using the first cell; and the terminal may determine, based on the cell information used during the PDCP duplication transmission, a second cell corresponding to the second RLC entity, where the second RLC entity sends the second PDCP PDU by using the second cell. Alternatively, FIG. 8B is still used as an example. During the PDCP duplication transmission, the terminal may determine, based on the carrier information used during the PDCP duplication transmission, a first carrier corresponding to the first RLC entity, where the first RLC entity sends the first PDCP PDU by using the first carrier; and the terminal may determine, based on the carrier information used during the PDCP duplication transmission, a second carrier corresponding to the second RLC entity, where the second RLC entity sends the second PDCP PDU by using the second carrier.

It may be understood that, if the PDCP duplication configuration information does not include the cell or carrier information used during the PDCP duplication transmission, an implementation method may be used, so that cells or carriers used by different RLC entities (or different logical channels) may not overlap each other. For example, when scheduling data, the network device may schedule data corresponding to different RLC entities (or different logical channels) to different cells/carriers.

In an implementation, the PDCP duplication status may include a PDCP duplication activated state or a PDCP duplication deactivated state. In some embodiments, for a signaling bearer, if the PDCP duplication configuration information is configured for the terminal, the PDCP duplication status is considered, by default, to be the PDCP duplication activated state. In some embodiments, for a data bearer, if the PDCP duplication configuration information is configured, the network device may indicate an initial state of the PDCP duplication status in RRC information. The initial state may be the PDCP duplication activated state or the PDCP duplication deactivated state. The network device may indicate, by using an MAC CE, the terminal to activate or deactivate the duplication status. In some embodiments, the PDCP duplication status may alternatively be indicated to the terminal when the network device indicates the terminal to enter the INACTIVE state or the IDLE state. In some embodiments, the PDCP duplication status may alternatively be a PDCP duplication status used by the terminal in the ACTIVE state. For example, the PDCP duplication status may be a latest PDCP duplication status used by the terminal before the terminal enters the INACTIVE state or the IDLE state from the ACTIVE state.

Operation 820: The terminal reestablishes an RLC entity for the PDCP duplication transmission.

Operation 830: Resume the PDCP duplication status based on the PDCP duplication configuration information included in the stored access stratum context.

For example, the resuming the PDCP duplication status may be reading data related to the PDCP duplication status from a memory or a storage medium that stores the PDCP duplication status.

It may be understood that a sequence of performing operation 810 and operation 820 is not limited in this embodiment. For example, operation 810 may be performed before operation 820, operation 820 may be performed before operation 810, or operation 810 and operation 820 may be performed at the same time.

In an implementation, the operation 830 may be performed when the terminal initiates or expects to initiate a connection resumption request. A sequence of performing operation 830 and sending the connection resumption request by the terminal is not limited in this embodiment. For example, the terminal may first perform operation 830 and then send the connection resumption request, or the terminal may first send the connection resumption request and then perform operation 830, or the terminal may perform operation 830 when sending the connection resumption request.

Figure 9A:
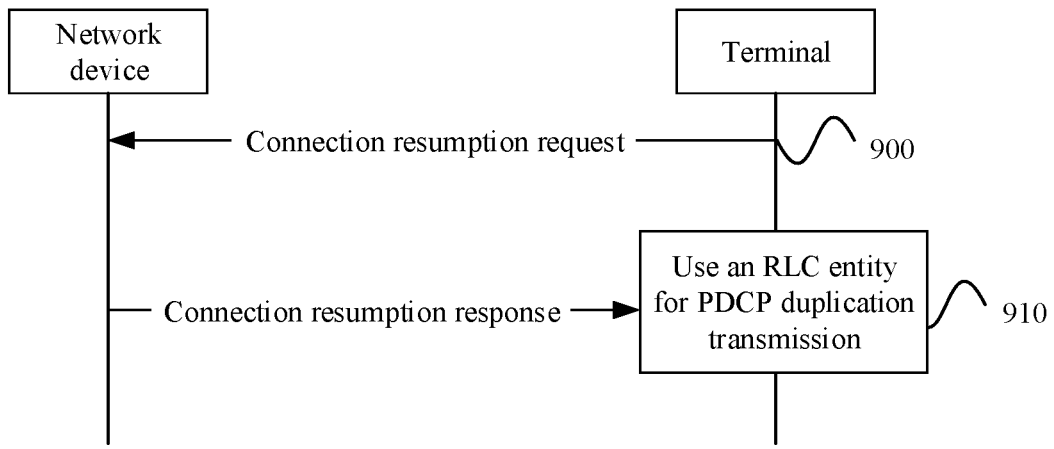
FIG. 9A is a schematic flowchart of connection resumption according to one embodiment.

In some embodiments, after the terminal sends the connection resumption request, the RLC entity for the PDCP duplication transmission described in operation 820 may be configured to receive a connection resumption response. In some embodiments, when the resumed PDCP duplication status described in operation 830 is the PDCP duplication activated state, the terminal determines to use the RLC entity for the PDCP duplication transmission to receive a duplicate connection resumption response. In some embodiments, the terminal may determine, based on a logical channel identifier included in the connection resumption response, to use the RLC entity for the PDCP duplication transmission to receive the connection resumption response. A connection resumption process shown in FIG. 9A is used as an example. In part 900, the terminal sends a connection resumption request to the network device. In part 910, the terminal receives, by using the RLC entity for the PDCP duplication transmission described in operation 820, a connection resumption response sent by the network device. FIG. 8B is used as an example. When the resumed PDCP duplication status described in operation 830 is the PDCP duplication activated state, the terminal receives, by using the first RLC entity in FIG. 8B, the connection resumption response sent by the network device, and receives, by using the second RLC entity in FIG. 8B, the connection resumption response sent by the network device. The second RLC entity may be understood as an RLC entity for the PDCP duplication transmission.

In another implementation, the operation 830 may be performed when the terminal initiates or expects to initiate a connection establishment request. A sequence of performing operation 830 and sending the connection establishment request by the terminal is not limited in this embodiment. For example, the terminal may first perform operation 830 and then send the connection establishment request, or the terminal may first send the connection establishment request and then perform operation 830, or the terminal may perform operation 830 when sending the connection establishment request.

Figure 9B:
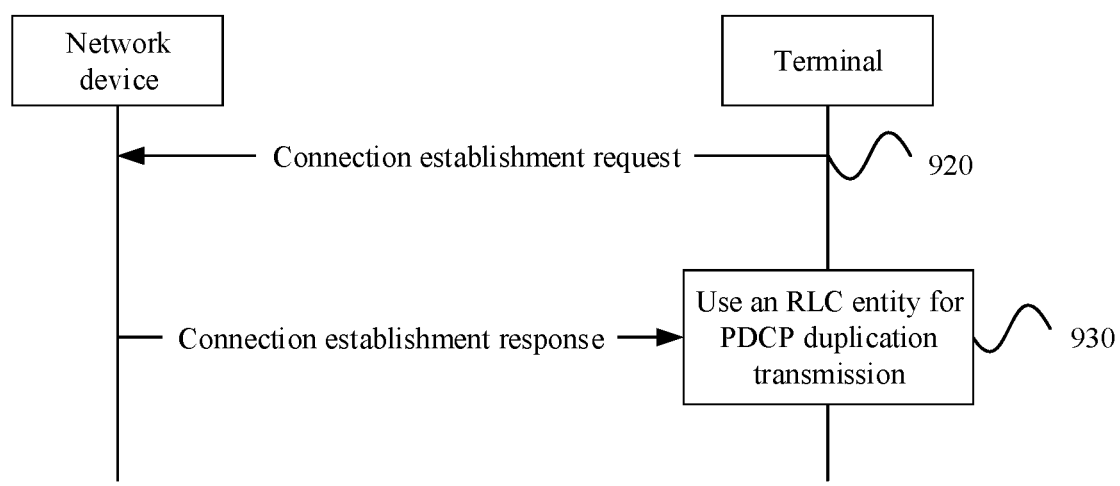
FIG. 9B is a schematic flowchart of connection establishment according to one embodiment.

In some embodiments, after the terminal sends the connection establishment request, the RLC entity for the PDCP duplication transmission described in operation 820 may be configured to receive a connection establishment response. In some embodiments, when the resumed PDCP duplication status described in operation 830 is the PDCP duplication activated state, the terminal determines to use the RLC entity for the PDCP duplication transmission to receive a duplicate connection establishment response. In some embodiments, the terminal may determine, based on a logical channel identifier included in the connection establishment response, to use the RLC entity for the PDCP duplication transmission to receive the connection establishment response. A connection establishment process shown in FIG. 9B is used as an example. In part 920, the terminal sends a connection establishment request to the network device. In part 930, the terminal receives, by using the RLC entity for the PDCP duplication transmission described in operation 820, a connection establishment response sent by the network device. FIG. 8B is used as an example. When the resumed PDCP duplication status described in operation 830 is the PDCP duplication activated state, the terminal receives, by using the first RLC entity in FIG. 8B, the connection establishment request sent by the network device, and receives, by using the second RLC entity in FIG. 8B, the connection establishment request sent by the network device. The second RLC entity may be understood as an RLC entity for the PDCP duplication transmission.

In still another implementation, the operation 830 may be performed when the terminal initiates or expects to initiate a connection reestablishment request. A sequence of performing operation 830 and sending the connection reestablishment request by the terminal is not limited in this embodiment. For example, the terminal may first perform operation 830 and then send the connection reestablishment request, or the terminal may first send the connection reestablishment request and then perform operation 830, or the terminal may perform operation 830 when sending the connection reestablishment request.

Figure 9C:
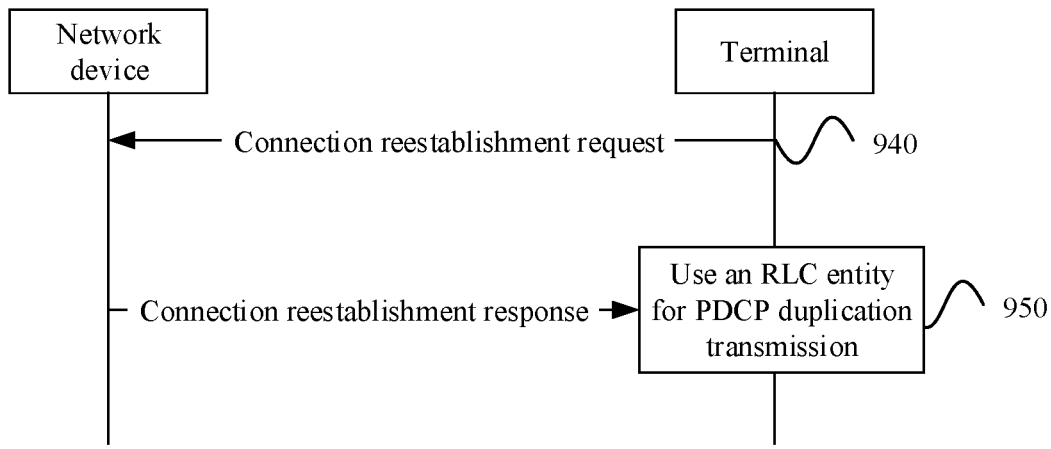
FIG. 9C is a schematic flowchart of connection reestablishment according to one embodiment.

In some embodiments, after the terminal sends the connection reestablishment request, the RLC entity for the PDCP duplication transmission described in operation 820 may be configured to receive the connection reestablishment response. In some embodiments, when the resumed PDCP duplication status described in operation 830 is the PDCP duplication activated state, the terminal determines to use the RLC entity for the PDCP duplication transmission to receive a duplicate connection reestablishment response. In some embodiments, the terminal may determine, based on a logical channel identifier included in the connection reestablishment response, to use the RLC entity for the PDCP duplication transmission to receive the connection reestablishment response. A connection reestablishment process shown in FIG. 9C is used as an example. In part 940, the terminal sends a connection reestablishment request to the network device. In part 950, the terminal receives, by using the RLC entity for the PDCP duplication transmission described in operation 820, a connection reestablishment response sent by the network device. FIG. 8B is used as an example. When the resumed PDCP duplication status described in operation 830 is the PDCP duplication activated state, the terminal receives, by using the first RLC entity in FIG. 8B, the connection reestablishment request sent by the network device, and receives, by using the second RLC entity in FIG. 8B, the connection reestablishment request sent by the network device. The second RLC entity may be understood as an RLC entity for the PDCP duplication transmission.

According to the implementation described above, the PDCP duplication configuration information of the radio bearer is stored, so that an entity or a status required for receiving the connection resumption response, the connection establishment response, or the connection reestablishment response can be quickly configured, thereby reducing a delay in connection resumption, connection establishment, or connection reestablishment.

In a implementation of operation 810 and operation 830, the PDCP duplication status may be understood as the PDCP duplication activated state. In this state, the PDCP duplication transmission is activated.

In a implementation of operation 800, the terminal may receive a connection release message sent by the network device, where the connection release message is used to indicate the terminal to enter the INACTIVE state or the IDLE state from the ACTIVE state; and the terminal enters the INACTIVE state or the IDLE state from the ACTIVE state according to the connection release message.

In another implementation of operation 800, the terminal may maintain a state timer, and if the state timer expires, the terminal enters the INACTIVE state or the IDLE state from the ACTIVE state. In some embodiments, the terminal starts or restarts the state timer when receiving downlink data or sending uplink data in the ACTIVE state.

In some embodiments, in the foregoing embodiment of this application, the terminal may send second information to the network device. For example, the second information may be included in a connection resumption request, a connection establishment request, a connection reestablishment request, or assistance information. For example, the assistance information may be carried in a UEAssistanceInformation (UEAssistanceInformation) message.

In a implementation, the second information may include cell information used by the terminal during the PDCP duplication transmission, and the cell information includes one or more of the following: signal quality information of a cell used by the terminal during the PDCP duplication transmission, signal strength information of a cell used by the terminal during the PDCP duplication transmission, or identification information of a cell used by the terminal during the PDCP duplication transmission. For example, the cell information may be any one of the following:

signal quality information of a cell used by the terminal during the PDCP duplication transmission;

signal strength information of a cell used by the terminal during the PDCP duplication transmission;

identification information of a cell used by the terminal during the PDCP duplication transmission;

signal quality information and signal strength information of a cell used by the terminal during the PDCP duplication transmission;

signal quality information and identification information of a cell used by the terminal during the PDCP duplication transmission;

signal strength information and identification information of a cell used by the terminal during the PDCP duplication transmission; or signal quality information, signal strength information, and identification information of a cell used by the terminal during the PDCP duplication transmission.

In another implementation, the second information may include carrier information used by the terminal during the PDCP duplication transmission, and the carrier information includes one or more of the following: signal quality information of a carrier used by the terminal during the PDCP duplication transmission, signal strength information of a carrier used by the terminal during the PDCP duplication transmission, or identification information of a carrier used by the terminal during the PDCP duplication transmission. For example, the carrier information may be any one of the following:

signal quality information of a carrier used by the terminal during the PDCP duplication transmission;

signal strength information of a carrier used by the terminal during the PDCP duplication transmission;

identification information of a carrier used by the terminal during the PDCP duplication transmission;

signal quality information and signal strength information of a carrier used by the terminal during the PDCP duplication transmission;

signal quality information and identification information of a carrier used by the terminal during the PDCP duplication transmission;

signal strength information and identification information of a carrier used by the terminal during the PDCP duplication transmission; or signal quality information, signal strength information, and identification information of a carrier used by the terminal during the PDCP duplication transmission.

Figure 10:
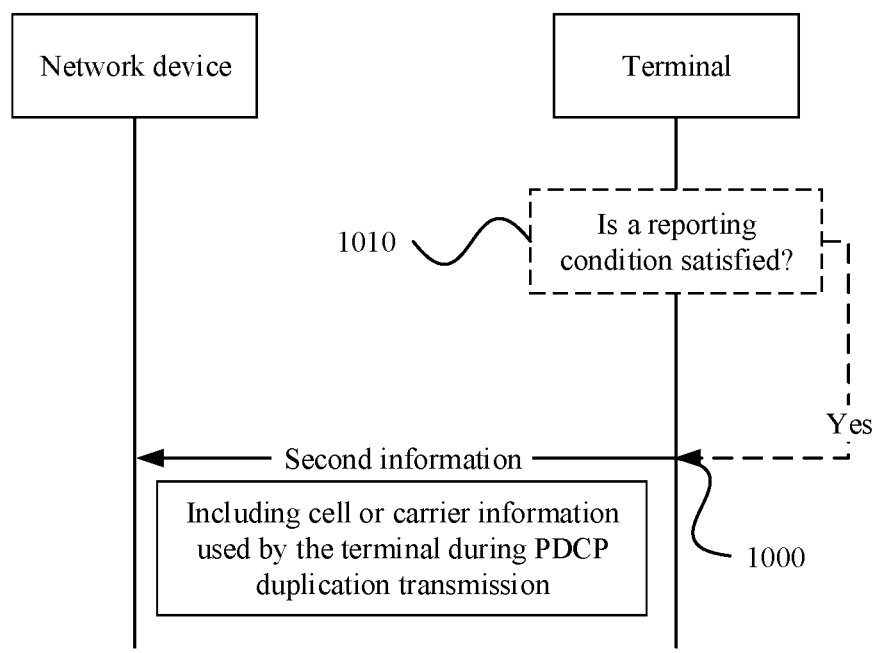
FIG. 10 is a schematic flowchart of a reporting procedure according to one embodiment.

A reporting procedure shown in FIG. 10 is used as an example. In part 1000, the terminal sends the second information, where the second information includes the cell or carrier information used by the terminal during the PDCP duplication transmission. In some embodiments, the reporting procedure shown in FIG. 10 may further include part 1010. To be specific, the terminal determines whether a reporting condition is met, and if the reporting condition is met, the terminal continues to perform part 1000 (that is, send the second information). The reporting condition may be any one of the following:

signal quality of a cell used by the terminal during the PDCP duplication transmission is less than a preset threshold;

signal quality of a cell used by the terminal during the PDCP duplication transmission is less than or equal to a preset threshold;

signal strength of a cell used by the terminal during the PDCP duplication transmission is less than a preset threshold;

signal strength of a cell used by the terminal during the PDCP duplication transmission is less than or equal to a preset threshold;

signal quality of a cell used by the terminal during the PDCP duplication transmission is greater than a preset threshold;

signal quality of a cell used by the terminal during the PDCP duplication transmission is greater than or equal to a preset threshold;

signal strength of a cell used by the terminal during the PDCP duplication transmission is greater than a preset threshold;

signal strength of a cell used by the terminal during the PDCP duplication transmission is greater than or equal to a preset threshold;

signal quality of a carrier used by the terminal during the PDCP duplication transmission is less than a preset threshold;

signal quality of a carrier used by the terminal during the PDCP duplication transmission is less than or equal to a preset threshold;

signal strength of a carrier used by the terminal during the PDCP duplication transmission is less than a preset threshold;

signal strength of a carrier used by the terminal during the PDCP duplication transmission is less than or equal to a preset threshold;

signal quality of a carrier used by the terminal during the PDCP duplication transmission is greater than a preset threshold;

signal quality of a carrier used by the terminal during the PDCP duplication transmission is greater than or equal to a preset threshold;

signal strength of a carrier used by the terminal during the PDCP duplication transmission is greater than a preset threshold; or signal strength of a carrier used by the terminal during the PDCP duplication transmission is greater than or equal to a preset threshold.

In the foregoing implementation, an amount of to-be-reported information can be reduced, and the network side determines whether there is an appropriate cell or carrier for the PDCP duplication transmission.

In a implementation of operation 810, the terminal may store the PDCP duplication configuration information of the radio bearer of the terminal in the ACTIVE state. In some embodiments, the ACTIVE state may be understood as the ACTIVE state (that is, the ACTIVE state before the terminal enters the INACTIVE state) described in operation 800.

In another implementation of operation 810, the PDCP duplication configuration information of the radio bearer of the terminal may be included in third information sent by the network device, and the terminal stores the PDCP duplication configuration information of the radio bearer based on the third information. For example, the third information may be included in DCI, a connection release message, a random access response, or a broadcast message.

In another implementation of operation 810, the terminal may store the PDCP duplication configuration information of the radio bearer under a condition. The terminal determines, based on fourth information from the network device, whether to store the PDCP duplication configuration information of the radio bearer. For example, the fourth information may be included in DCI, a connection release message, a random access response, or a broadcast message.

In some embodiments, the terminal determines, based on content indicated by the fourth information, whether to store the PDCP duplication configuration information of the radio bearer. In a possible manner, the fourth information indicates whether to store the PDCP duplication configuration information of the radio bearer. For example, the fourth information includes 1-bit indication information, and when the 1-bit indication information is "0", the terminal is indicated to store the PDCP duplication configuration information of the radio bearer; or when the 1-bit indication information is "1", the terminal is indicated not to store the PDCP duplication configuration information of the radio bearer. For another example, when the 1-bit indication information is "1", the terminal is indicated to store the PDCP duplication configuration information of the radio bearer; or when the 1-bit indication information is "0", the terminal is indicated not to store the PDCP duplication configuration information of the radio bearer.

In some embodiments, the terminal determines whether to store the PDCP duplication configuration information of the radio bearer depending on whether the terminal has received the fourth information. In a possible manner, whether to store the PDCP duplication configuration information of the radio bearer depends on whether the fourth information exists. For example, when the terminal has received the fourth information, the terminal stores the PDCP duplication configuration information of the radio bearer; or when the terminal has not received the fourth information, the terminal does not store the PDCP duplication configuration information of the radio bearer. For another example, when the terminal has not received the fourth information, the terminal stores the PDCP duplication configuration information of the radio bearer; or when the terminal has received the fourth information, the terminal does not store the PDCP duplication configuration information of the radio bearer.

It may be understood that the Various embodiments shown in FIG. 3 and FIG. 8A may be combined. For example, the method shown in FIG. 3 may be first performed, and then the method shown in FIG. 8A is performed. For another example, the method shown in FIG. 8A may be first performed, and then the method shown in FIG. 3 is performed. For another example, the methods shown in FIG. 3 and FIG. 8A may be performed at the same time.

It may be understood that various embodiments shown in FIG. 3 and FIG. 8A may alternatively be independently performed.

Descriptions related to A and B in this application are merely used to describe a correspondence existing between A and B, and are not used to limit a specific implementation of implementing the correspondence between A and B in the Various embodiments. For example, the correspondence between A and B may be implemented in a specific form such as a function or a mapping table.

The correspondence shown in the table in this application may be configured, or may be predefined, stored, pre-negotiated, preconfigured, or fixed. Values of the indication information in each table are merely examples, and may be other values. This is not limited in this application. During specific implementation, it is not necessarily required that all correspondences are shown in the tables. For example, in the foregoing tables, correspondences shown in some rows may not be configured or predefined. For another example, proper deformation and adjustment, for example, splitting and combination, may be performed based on the foregoing table. Names of the parameters shown in the titles of the foregoing tables may be other names that can be understood by a communications device, and values or representation forms of the parameters may be other values or representation forms that can be understood by the communications device. When the correspondences shown in the foregoing tables are implemented, other data structures may be used. For example, an array, a queue, a container, a stack, a linear table, a pointer, a linked list, a tree, a graph, a structure, a class, a heap, a hash table, or the like may be used.

It may be understood that the methods implemented by the communications device in the foregoing method embodiments may alternatively be implemented by a component (for example, an integrated circuit or a chip) that can be used in the communications device.

Corresponding to the wireless communication method provided in the foregoing method embodiments, one embodiment further provides a corresponding communications apparatus (which is sometimes referred to as a communications device). The communications apparatus includes a corresponding module configured to perform each part in the foregoing embodiments. The module may be software, hardware, or a combination of software and hardware.

Figure 11:
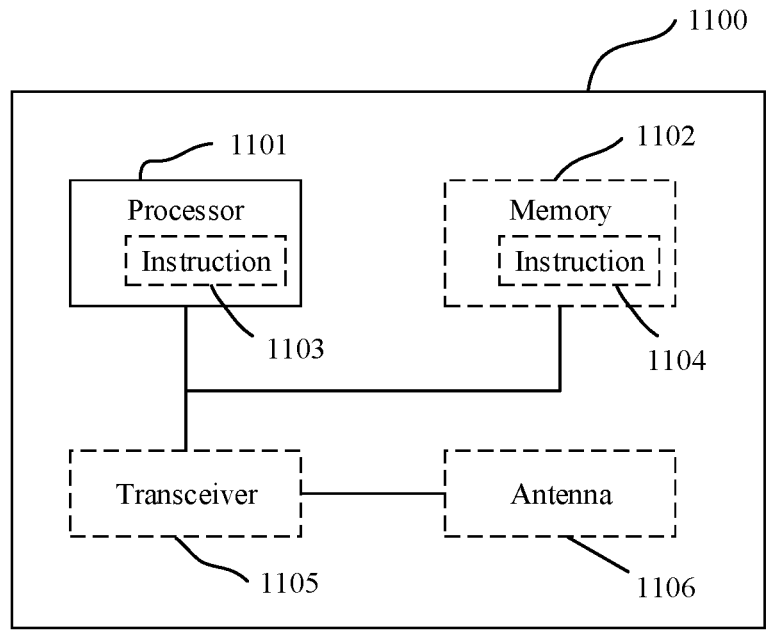
FIG. 11 is a schematic structural diagram of a communications apparatus according to one embodiment.

FIG. 11 is a schematic structural diagram of a communications apparatus. The communications apparatus 1100 may be the network device 10 or 20 in FIG. 2, or may be the terminal 11, 12, 21, or 22 in FIG. 2. The communications apparatus may be configured to implement the methods that correspond to the communications devices and that are described in the foregoing method embodiments. For details, refer to the descriptions in the foregoing method embodiments.

The communications apparatus 1100 may include one or more processors 1101. The processor 1101 may also be referred to as a processing unit, and may implement a control function. The processor 1101 may be a general purpose processor, a dedicated processor, or the like. For example, the processor may be a baseband processor or a central processing unit. The baseband processor may be configured to process a communication protocol and communication data. The central processing unit may be configured to control the communications apparatus (for example, a base station, a baseband chip, a distributed unit (DU), or a centralized unit (CU)), execute a software program, and process data of the software program.

In an optional design, the processor 1101 may alternatively store an instruction 1103, and the instruction may be run by the processor, so that the communications apparatus 1100 performs the methods that correspond to the communications devices and that are described in the foregoing method embodiments.

In another possible design, the communications apparatus 1100 may include a circuit, and the circuit may implement the function of sending, receiving, or communication in the foregoing method embodiments.

In some embodiments, the communications apparatus 1100 may include one or more memories 1102. The memory 1102 may store an instruction 1104, and the instruction may be run on the processor, so that the communications apparatus 1100 performs the methods described in the foregoing method embodiments. In some embodiments, the memory may also store data. In some embodiments, the processor may further store an instruction and/or data. The processor and the memory may be disposed separately, or may be integrated together.

In some embodiments, the communications apparatus 1100 may further include a transceiver 1105 and/or an antenna 1106. The processor 1101 may be referred to as a processing unit, and controls the communications apparatus (a terminal or a network device). The transceiver 1105 may be referred to as a transceiver unit, a transceiver machine, a transceiver circuit, a transceiver, or the like, and is configured to implement receiving and sending functions of the communications apparatus.

In a possible design, a communications apparatus 1100 (for example, an integrated circuit, a wireless device, a circuit module, or a terminal) may include a processor 1101 and a transceiver 1105. The transceiver 1105 receives first information, where the first information is carried in a connection release message, a broadcast message, physical random access channel configuration information, or a random access response, and the first information includes information related to a first frequency domain resource and information related to a second frequency domain resource. The processor 1101 determines the first frequency domain resource and the second frequency domain resource based on the first information. The transceiver 1105 sends uplink information by using the first frequency domain resource, and sends the uplink information by using the second frequency domain resource, where the uplink information is used to request connection resumption, connection establishment, or connection reestablishment.

In another possible design, a communications apparatus 1100 (for example, an integrated circuit, a wireless device, a circuit module, or a terminal) may include a processor 1101 and a memory 1102. The communications apparatus 1100 enters an inactive state or an idle state from an active state, and the memory 1102 stores an access stratum context of the communications apparatus 1100, where the access stratum context includes PDCP duplication configuration information of a radio bearer of the communications apparatus 1100, and the PDCP duplication configuration information includes a PDCP duplication status and/or carrier information used during PDCP duplication transmission. The processor 1101 reestablishes an RLC entity for the PDCP duplication transmission. The processor 1101 resumes the PDCP duplication status based on the PDCP duplication configuration information included in the stored access stratum context. In some embodiments, the communications apparatus 1100 further includes a transceiver 1105. The transceiver 1105 sends a connection resumption request, and receives a connection resumption response by using the RLC entity for the PDCP duplication transmission; the transceiver 1105 sends a connection establishment request, and receives a connection establishment response by using the RLC entity for the PDCP duplication transmission; or the transceiver 1105 sends a connection reestablishment request, and receives a connection reestablishment response by using the RLC entity for the PDCP duplication transmission.

In another possible design, a communications apparatus 1100 (for example, an integrated circuit, a wireless device, a circuit module, or a network device) may include a transceiver 1105. The transceiver 1105 sends first information, where the first information includes information related to a first frequency domain resource and information related to a second frequency domain resource, and the first information is carried in a connection release message, a broadcast message, physical random access channel configuration information, or a random access response. The transceiver 1105 receives, on the first frequency domain resource, uplink information from a terminal, and receives, on the second frequency domain resource, the uplink information from the terminal, where the uplink information is used to request connection resumption, connection establishment, or connection reestablishment.

In another possible design, a communications apparatus 1100 (for example, an integrated circuit, a wireless device, a circuit module, or a network device) may include a transceiver 1105. The transceiver 1105 receives second information. The second information includes cell information used by a terminal during PDCP duplication transmission, and the cell information used by the terminal during the PDCP duplication transmission includes one or more of the following: signal quality information of a cell used by the terminal during the PDCP duplication transmission, signal strength information of a cell used by the terminal during the PDCP duplication transmission, or identification information of a cell used by the terminal during the PDCP duplication transmission; or the second information includes carrier information used by a terminal during PDCP duplication transmission, and the carrier information used by the terminal during the PDCP duplication transmission includes one or more of the following: signal quality information of a carrier used by the terminal during the PDCP duplication transmission, signal strength information of a carrier used by the terminal during the PDCP duplication transmission, or identification information of a carrier used by the terminal during the PDCP duplication transmission. In some embodiments, the communications apparatus 1100 further includes a processor 1101, and the processor 1101 determines, based on the second information, whether there is a cell or a carrier that meets a predefined condition and that can be for the PDCP duplication transmission.

In another design, a communications apparatus 1100 (for example, an integrated circuit, a wireless device, a circuit module, or a network device) may include a memory 1102. The memory 1102 stores an access stratum context of the terminal, where the access stratum context includes PDCP duplication configuration information of a radio bearer of the terminal, and the PDCP duplication configuration information includes a PDCP duplication status and/or cell or carrier information used during PDCP duplication transmission.

In another design, a communications apparatus 1100 (for example, an integrated circuit, a wireless device, a circuit module, or a network device) may include a transceiver 1105. The transceiver 1105 sends third information, where the third information includes PDCP duplication configuration information of a radio bearer of the terminal, the PDCP duplication configuration information is included in an access stratum context of the terminal, and the PDCP duplication configuration information includes a PDCP duplication status and/or cell or carrier information used during PDCP duplication transmission.

In another design, a communications apparatus 1100 (for example, an integrated circuit, a wireless device, a circuit module, or a network device) may include a transceiver 1105. The transceiver 1105 sends fourth information, where the fourth information is used to indicate whether the terminal stores an access stratum context of the terminal.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an n-channel metal-oxide-semiconductor (NMOS), a p-channel metal-oxide-semiconductor (PMOS), a bipolar junction transistor (BJT), a bipolar CMOS (BiCMOS), silicon germanium (SiGe), and gallium arsenide (GaAs).

In the descriptions of the foregoing embodiments, the communications apparatus is described by using the network device or the terminal as an example. However, a scope of the communications apparatus described in this application is not limited to the example, and the structure of the communications apparatus may not be limited by FIG. 11. The communications apparatus may be an independent device or may be a part of a relatively large device. For example, the device may be:

(1) an independent integrated circuit (IC), a chip, or a chip system or subsystem;

(2) a set including one or more ICs, where in some embodiments, the IC set may further include a storage component configured to store data and/or an instruction;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; and (6) another device or the like.

Figure 12:
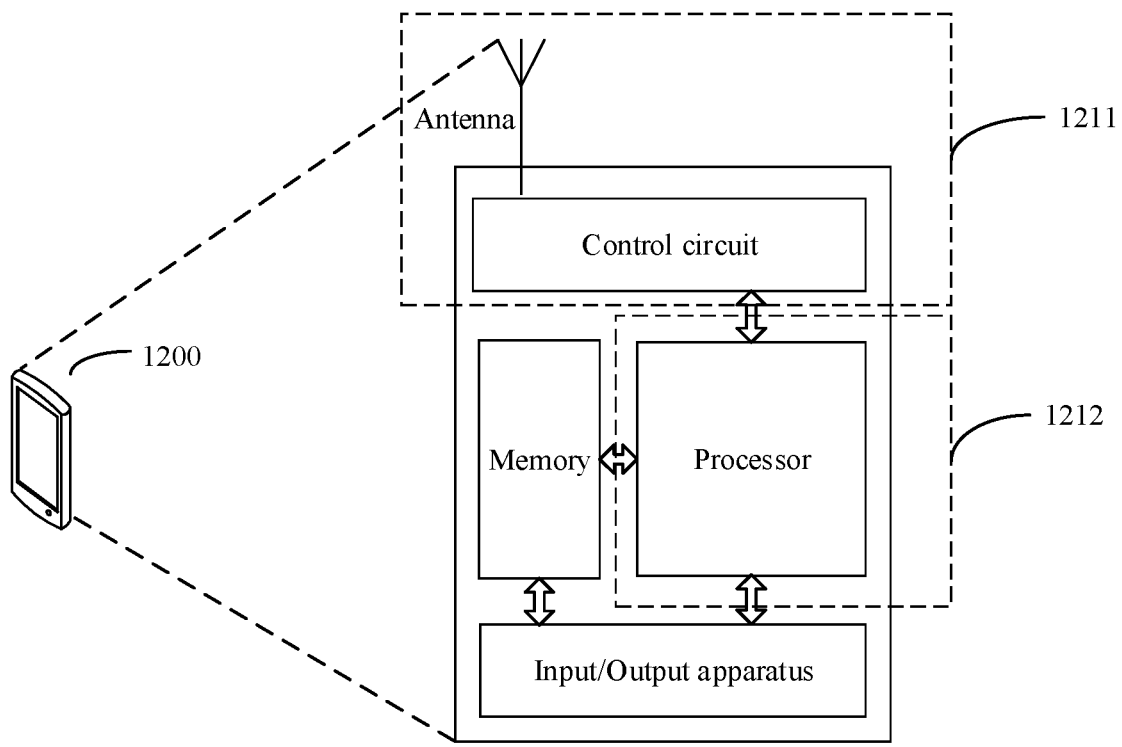
FIG. 12 is a schematic structural diagram of a terminal according to one embodiment.

FIG. 12 is a schematic structural diagram of a terminal. The terminal may be applicable to the system shown in FIG. 2. For ease of description, FIG. 12 shows only main components of the terminal. As shown in FIG. 12, the terminal 1200 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to receive data entered by a user and output data to the user.

After user equipment is turned on, the processor may read a software program stored in a storage unit, parse and execute an instruction of the software program, and process data of the software program. When data needs to be sent wirelessly, after performing baseband processing on the to-be-sent data, the processor outputs a baseband signal to a radio frequency circuit. After processing the baseband signal, the radio frequency circuit obtains a radio frequency signal and sends the radio frequency signal to the outside through an antenna in a form of an electromagnetic wave. When data is sent to the user equipment, the radio frequency circuit receives a radio frequency signal by using the antenna, further converts the radio frequency signal into a baseband signal, and outputs the baseband signal to the processor, and the processor converts the baseband signal into data and processes the data.

A person skilled in the art may understand that, for ease of description, FIG. 12 shows only one memory and one processor. An actual terminal may include a plurality of processors and a plurality of memories. The memory may also be referred to as a storage medium, a storage device, or the like. This is not limited in this embodiment.

In an example implementation, the processor may include a baseband processor and a central processing unit. The baseband processor is mainly configured to process a communication protocol and communication data, and the central processing unit is mainly configured to: control the entire terminal, execute a software program, and process data of the software program. The processor in FIG. 12 integrates functions of the baseband processor and the central processing unit. A person skilled in the art may understand that the baseband processor and the central processing unit may be individually independent processors, and are interconnected by using a technology such as a bus. A person skilled in the art may understand that the terminal may include a plurality of baseband processors to adapt to different network standards, and the terminal may include a plurality of central processing units to enhance a processing capability of the terminal. All components of the terminal may be connected by using various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program, and the processor executes the software program to implement a baseband processing function.

In an example, an antenna and a control circuit that have receiving and sending functions may be considered as a transceiver unit 1211 of the terminal 1200, and a processor that has a processing function may be considered as a processing unit 1212 of the terminal 1200. As shown in FIG. 12, the terminal 1200 includes the transceiver unit 1211 and the processing unit 1212. The transceiver unit may also be referred to as a transceiver, a transceiver machine, a transceiver apparatus, or the like. In some embodiments, a component that is in the transceiver unit 1211 and that is configured to implement a receiving function may be considered as a receiving unit, and a component that is in the transceiver unit 1211 and that is configured to implement a sending function may be considered as a sending unit. In other words, the transceiver unit 1211 includes the receiving unit and the sending unit. For example, the receiving unit may also be referred to as a receiver, a receiver machine, a receive circuit, or the like, and the sending unit may be referred to as a transmitter machine, a transmitter, a transmit circuit, or the like. In some embodiments, the receiving unit and the sending unit may be one unit integrated together, or may be a plurality of units independent of each other. The receiving unit and the sending unit may be located at one geographical location, or may be scattered at a plurality of geographical locations.

Figure 13:
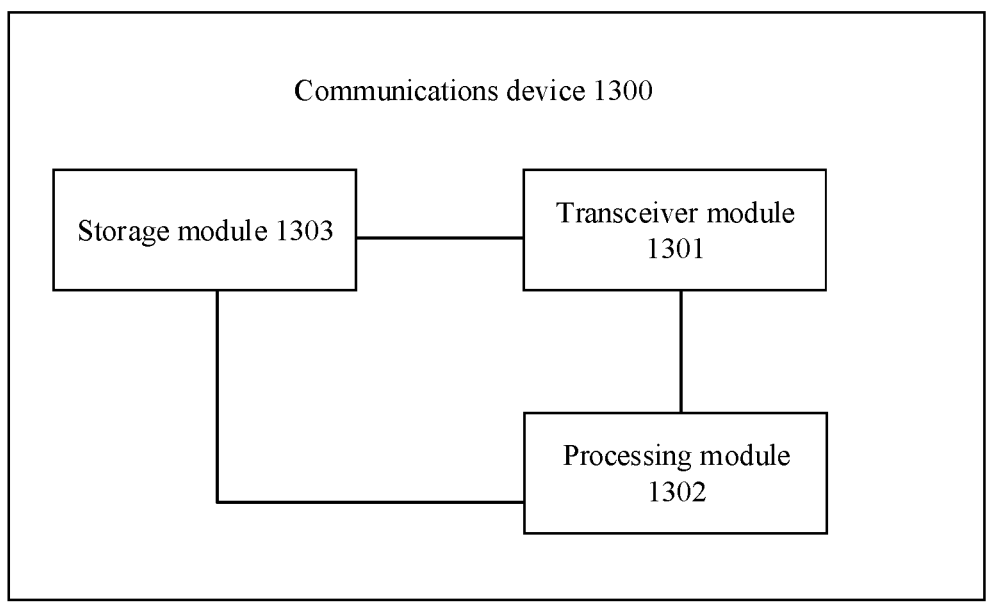
FIG. 13 is a schematic diagram of a communications device according to one embodiment.

As shown in FIG. 13, another embodiment of this application provides a communications apparatus (communications device) 1300. The communications apparatus may be a terminal, or may be a component (for example, an integrated circuit or a chip) of a terminal. The communications apparatus may alternatively be a network device, or may be a component (for example, an integrated circuit or a chip) of a network device. Alternatively, the communications apparatus may be another communication module, configured to implement an operation corresponding to the communications device in the method Various embodiments. The communications apparatus 1300 may include a processing module 1302. In some embodiments, the communications apparatus 1300 may further include a transceiver module 1301 and a storage module 1303.

In a possible design, one or more modules in FIG. 13 may be implemented by one or more processors, or may be implemented by one or more processors and memories, or may be implemented by one or more processors and transceivers, or may be implemented by one or more processors, memories, and transceivers. This is not limited in this embodiment. The processor, the memory, and the transceiver may be separately disposed, or may be integrated together.

The communications apparatus 1300 has a function of implementing the terminal described in the Various embodiments. For example, the communications apparatus includes corresponding modules, units, or means (means) that perform the steps related to the terminal described in the Various embodiments, and the functions, units, or means (means) may be implemented by using software, may be implemented by hardware, or may be implemented by hardware executing corresponding software. For details, reference may be further made to corresponding descriptions in the foregoing corresponding method embodiments.

Alternatively, the communications apparatus 1300 has a function of implementing the network device described in various embodiments. For example, the communications apparatus includes corresponding modules, units, or means that perform the steps related to the network device described in the Various embodiments, and the functions, units, or means may be implemented by using software, may be implemented by hardware, or may be implemented by hardware executing corresponding software. For details, reference may be further made to corresponding descriptions in the foregoing corresponding method embodiments.

In some embodiments, the modules in the communications apparatus 1300 in this embodiment may be configured to perform the methods described in the Various embodiments.

In a implementation, the transceiver module 1301 receives first information from a network device, where the first information includes information related to a first frequency domain resource and information related to a second frequency domain resource; the processing module 1302 determines the first frequency domain resource and the second frequency domain resource based on the first information, where the first information is carried in a connection release message, a broadcast message, physical random access channel configuration information, or a random access response; and the transceiver module 1301 sends uplink information by using the first frequency domain resource, and sends the uplink information by using the second frequency domain resource, where the uplink information is used to request connection resumption, connection establishment, or connection reestablishment.

In some embodiments, the processing module 1302 obtains M frequency domain resources based on the first information, where M is an integer greater than 2; and the processing module 1302 determines the first frequency domain resource and the second frequency domain resource based on the M frequency domain resources.

In some embodiments, the processing module 1302 randomly determines the first frequency domain resource and the second frequency domain resource in the M frequency domain resources; the processing module 1302 determines, based on an identifier of a terminal, the first frequency domain resource and the second frequency domain resource in the M frequency domain resources; or the processing module 1302 determines, based on a cause for a connection request, the first frequency domain resource and the second frequency domain resource in the M frequency domain resources, where the connection request is a connection resumption request, a connection establishment request, or a connection reestablishment request.

In some embodiments, the processing module 1302 determines, based on a cause for a connection request, whether to send the uplink information by using the first frequency domain resource, and send the uplink information by using the second frequency domain resource, where the connection request is a connection resumption request, a connection establishment request, or a connection reestablishment request; or the processing module 1302 determines, based on a higher layer indication of the terminal or a higher layer request of the terminal, whether to send the uplink information by using the first frequency domain resource, and send the uplink information by using the second frequency domain resource.

In some embodiments, the processing module 1302 obtains a physical random access channel configuration based on the physical random access channel configuration information, where the physical random access channel configuration is used to configure a time-frequency resource and a format of a random access preamble.

In some embodiments, the physical random access channel configuration corresponds to the first frequency domain resource and the second frequency domain resource; and the processing module 1302 determines the first frequency domain resource and the second frequency domain resource based on the physical random access channel configuration.

In some embodiments, the first frequency domain resource is used by the transceiver module 1301 to initially transmit the uplink information in a first hybrid automatic repeat request (HARQ) process, and the second frequency domain resource is used by the transceiver module 1301 to retransmit the uplink information in the first HARQ process.

In some embodiments, the first frequency domain resource is used by the transceiver module 1301 to initially transmit the uplink information in a first HARQ process, and the second frequency domain resource is used by the transceiver module 1301 to initially transmit the uplink information in a second HARQ process.

In some embodiments, the first frequency domain resource is used by the transceiver module 1301 to send the uplink information in a first bandwidth part (BWP), and the second frequency domain resource is used by the transceiver module 1301 to send the uplink information in a second BWP; the first frequency domain resource is used by the transceiver module 1301 to send the uplink information on a first carrier, and the second frequency domain resource is used by the transceiver module 1301 to send the uplink information on a second carrier; or the first frequency domain resource is used by the transceiver module 1301 to send the uplink information in a first cell, and the second frequency domain resource is used by the transceiver module 1301 to send the uplink information in a second cell.

In some embodiments, the communications device 1300 enters an inactive state or an idle state from an active state, and the storage module 1303 stores an access stratum context of the communications device 1300, where the access stratum context includes packet data convergence protocol (PDCP) duplication configuration information of a radio bearer of the communications device 1300, and the PDCP duplication configuration information includes a PDCP duplication status and/or cell or carrier information used during PDCP duplication transmission. The communications device 1300 reestablishes a radio link control (RLC) entity for the PDCP duplication transmission. The processing module 1302 resumes the PDCP duplication status based on the PDCP duplication configuration information included in the stored access stratum context. In some embodiments, the transceiver module 1301 sends a connection resumption request, and receives a connection resumption response by using the RLC entity for the PDCP duplication transmission; the transceiver module 1301 sends a connection establishment request, and receives a connection establishment response by using the RLC entity for the PDCP duplication transmission; or the transceiver module 1301 sends a connection reestablishment request, and receives a connection reestablishment response by using the RLC entity for the PDCP duplication transmission.

In some embodiments, the transceiver module 1301 sends second information to the network device. The second information includes cell information used by the communications device 1300 during the PDCP duplication transmission, and the cell information used by the communications device 1300 during the PDCP duplication transmission includes one or more of the following: signal quality information of a cell used by the communications device 1300 during the PDCP duplication transmission, signal strength information of a cell used by the communications device 1300 during the PDCP duplication transmission, or identification information of a cell used by the communications device 1300 during the PDCP duplication transmission; or the second information includes carrier information used by the communications device 1300 during the PDCP duplication transmission, and the carrier information used by the communications device 1300 during the PDCP duplication transmission includes one or more of the following: signal quality information of a carrier used by the communications device 1300 during the PDCP duplication transmission, signal strength information of a carrier used by the communications device 1300 during the PDCP duplication transmission, or identification information of a carrier used by the communications device 1300 during the PDCP duplication transmission.

In some embodiments, when the signal quality or the signal strength of the cell used by the communications device 1300 during the PDCP duplication transmission is less than a predefined threshold, the transceiver module 1301 sends the second information to the network device; when the signal quality or the signal strength of the cell used by the communications device 1300 during the PDCP duplication transmission is greater than or equal to a predefined threshold, the transceiver module 1301 sends the second information to the network device; when the signal quality or the signal strength of the carrier used by the communications device 1300 during the PDCP duplication transmission is less than a predefined threshold, the transceiver module 1301 sends the second information to the network device; or when the signal quality or the signal strength of the carrier used by the communications device 1300 during the PDCP duplication transmission is greater than or equal to a predefined threshold, the transceiver module 1301 sends the second information to the network device.

In some embodiments, the second information is carried in a connection resumption request, a connection establishment request, a connection reestablishment request, or assistance information.

In some embodiments, the access stratum context includes packet data convergence protocol PDCP duplication configuration information of a radio bearer of the communications device 1300 in the active state; or packet data convergence protocol PDCP duplication configuration information that is of a radio bearer of the terminal and that is included in the access stratum context is included in third information sent by the network device.

In some embodiments, the transceiver module 1301 receives fourth information from the network device, and determines, based on the fourth information, whether to store the access stratum context of the terminal.

In some embodiments, the third information is included in a connection release message.

In some embodiments, the fourth information is included in a connection release message.

In another implementation, the transceiver 1301 sends first information, where the first information includes information related to a first frequency domain resource and information related to a second frequency domain resource, and the first information is carried in a connection release message, a broadcast message, physical random access channel configuration information, or a random access response. The transceiver module 1301 receives, on the first frequency domain resource, uplink information from the terminal, and receives, on the second frequency domain resource, the uplink information from the terminal, where the uplink information is used to request connection resumption, connection establishment, or connection reestablishment.

In some embodiments, the transceiver module 1301 receives the second information. The second information includes cell information used by the terminal during the PDCP duplication transmission, and the cell information used by the terminal during the PDCP duplication transmission includes one or more of the following: signal quality information of a cell used by the terminal during the PDCP duplication transmission, signal strength information of a cell used by the terminal during the PDCP duplication transmission, or identification information of a cell used by the terminal during the PDCP duplication transmission; or the second information includes carrier information used by the terminal during the PDCP duplication transmission, and the carrier information used by the terminal during the PDCP duplication transmission includes one or more of the following: signal quality information of a carrier used by the terminal during the PDCP duplication transmission, signal strength information of a carrier used by the terminal during the PDCP duplication transmission, or identification information of a carrier used by the terminal during the PDCP duplication transmission. In this implementation, the terminal reports information, so that the network side may determine, based on the reported information, whether there is an appropriate cell or carrier for the PDCP duplication transmission.

In some embodiments, the second information is carried in a connection resumption request, a connection establishment request, a connection reestablishment request, or assistance information.

In some embodiments, the transceiver module 1301 sends third information, where the third information includes PDCP duplication configuration information of a radio bearer of the terminal, the PDCP duplication configuration information is included in an access stratum context of the terminal, and the PDCP duplication configuration information includes a PDCP duplication status and/or cell or carrier information used during the PDCP duplication transmission.

In some embodiments, the transceiver module 1301 sends fourth information, where the fourth information is used to indicate whether the terminal stores the access stratum context of the terminal.

In some embodiments, the third information is included in a connection release message. In some embodiments, the fourth information is included in a connection release message.

A person skilled in the art may further understand that various illustrative logical blocks (illustrative logical block) and steps (step) listed in various embodiments may be implemented by using electronic hardware, a computer program, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of various embodiments.

The technologies described in this application may be implemented in various manners. For example, these technologies may be implemented by using hardware, software, or a combination of hardware and software. For hardware implementation, a processing unit configured to perform these technologies at a communications apparatus (for example, a base station, a terminal, a network entity, or a chip) may be implemented in one or more general-purpose processors, a digital signal processor (DSP), a digital signal processing device (DSPD), an application-specific integrated circuit (ASIC), a programmable logic device (PLD), a field-programmable gate array (FPGA), or another programmable logic apparatus, a discrete gate or transistor logic, a discrete hardware component, or any combination thereof. The general processor may be a microprocessor. In some embodiments, the general processor may also be any traditional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

A person of ordinary skill in the art may understand that various reference numerals such as "first" and "second" in this application are merely used for differentiation for ease of description, and are not used to limit a scope of the Various embodiments, or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. At least two means two or more. "At least one", "any one", or a similar expression thereof means any combination of these items, including any combination of a single item (quantity) or a plurality of items (quantity). For example, at least one (piece, or type) of a, b, or c may indicate: a, b, c, a-b, a-c, b-c, or a-b-c, where a, b, and c may be singular or plural.

Steps of the methods or algorithms described in various embodiments may be directly embedded in hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor so that the processor may read information from the memory and write information to the memory. Alternatively, the memory may further be integrated into a processor. The processor and the memory may be disposed in an ASIC, and the ASIC may be disposed in a terminal. In some embodiments, the processor and the memory may alternatively be disposed in different components of the terminal.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to various embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like. The foregoing combination should also be included in the protection scope of the computer-readable medium.

For same or similar parts in the embodiments of this specification, refer to each other. The foregoing descriptions are implementations of this application, but are not intended to limit the protection scope of this application.

What is claimed is:

1. An apparatus, comprising:
one or more processors;
a memory configured to store a program to be executed by the one or more processors, the program, when executed, causes the one or more processors to:
    receive first information from a network device, wherein
        the first information comprises information related to a first frequency domain resource and information related to a second frequency domain resource;
    determine the first frequency domain resource and the second frequency domain resource based on the first information, wherein
        the first information is carried in a connection release message, a broadcast message, physical random access channel configuration information, or a random access response;
    determine, based on a cause for a connection request, whether to send uplink information by using the first frequency domain resource and the second frequency domain resource; and
    send the uplink information according to the first frequency domain resource and the second frequency domain resource based on the cause for the connection request, wherein
        the uplink information is configured for requesting connection resumption, connection establishment, or connection reestablishment,
        the connection request is a connection resumption request, a connection establishment request, or a connection reestablishment request, and
        the cause for the connection request includes the connection resumption request being triggered by a quality of service identifier having an index value associated with at least a first service type.

2. The apparatus according to claim 1, wherein
the first information comprises information about M frequency domain resources,
M is an integer greater than 2, and
determining the first frequency domain resource and the second frequency domain resource based on the first information comprises:
determining the first frequency domain resource and the second frequency domain resource determining the first frequency domain resource and the second frequency domain resource based on the information about the M frequency domain resources.

3. The apparatus according to claim 2, wherein determining the first frequency domain resource and the second frequency domain resource based on the information about the M frequency domain resources comprises:
randomly determining the first frequency domain resource and the second frequency domain resource in the M frequency domain resources indicated by the information about the M frequency domain resources;
determining, based on an identifier of a terminal, the first frequency domain resource and the second frequency domain resource in the M frequency domain resources indicated by the information about the M frequency domain resources; or
determining, based on the cause for the connection request, the first frequency domain resource and the second frequency domain resource in the M frequency domain resources indicated by the information about the M frequency domain resources.

4. The apparatus according to claim 1, wherein the one or more processors are further caused to:
obtain a physical random access channel configuration based on physical random access channel configuration information, wherein
the physical random access channel configuration configures a time-frequency resource and a format of a random access preamble,
the physical random access channel configuration corresponds to the first frequency domain resource and the second frequency domain resource, and
determining the first frequency domain resource and the second frequency domain resource based on the first information comprises:
determining the first frequency domain resource and the second frequency domain resource determining the first frequency domain resource and the second frequency domain resource based on the physical random access channel configuration.

5. The apparatus according to claim 1, wherein
the information related to the first frequency domain resource is information indicating the first frequency domain resource,
the information related to the second frequency domain resource is information indicating the second frequency domain resource, and
determining the first frequency domain resource and the second frequency domain resource based on the first information comprises:
determining the first frequency domain resource based on the information related to the first frequency domain resource; and
determining the second frequency domain resource based on the information related to the second frequency domain resource.

6. The apparatus according to claim 1, wherein
the information related to the first frequency domain resource is information indicating the first frequency domain resource,
the information related to the second frequency domain resource is information indicating to obtain the second frequency domain resource based on the first frequency domain resource and with reference to a predefined or configured rule, and
determining the first frequency domain resource and the second frequency domain resource based on the first information comprises:
determining the first frequency domain resource based on the information related to the first frequency domain resource; and
determining the second frequency domain resource based on the information related to the first frequency domain resource, the information related to the second frequency domain resource, and the predefined or configured rule.

7. The apparatus according to claim 1, wherein the first frequency domain resource is used to initially transmit the uplink information in a first hybrid automatic repeat request (HARQ) process, and the second frequency domain resource is used to retransmit the uplink information in the first HARQ process; or
the first frequency domain resource is used to initially transmit the uplink information in a first HARQ process, and the second frequency domain resource is used to initially transmit the uplink information in a second HARQ process.

8. The apparatus according to claim 1, wherein
the first frequency domain resource is used to send the uplink information in a first bandwidth part (BWP), and the second frequency domain resource is used to send the uplink information in a second BWP; or
the first frequency domain resource is configured for sending the uplink information on a first carrier, and the second frequency domain resource is for sending the uplink information on a second carrier; or
the first frequency domain resource is used to send the uplink information in a first cell, and the second frequency domain resource is used to send the uplink information in a second cell.

9. The apparatus according to claim 1, wherein the uplink information is sent according to the first frequency domain resource or the second frequency domain resource when the quality of service identifier has an index value associated with a second service type different from the first service type.

10. A method, comprising:
receiving first information from a network device, wherein
the first information comprises information related to a first frequency domain resource and information related to a second frequency domain resource;
determining the first frequency domain resource and the second frequency domain resource based on the first information, wherein
the first information is carried in a connection release message, a broadcast message, or physical random access channel configuration information;
determining, based on a cause for a connection request, whether to send uplink information by using the first frequency domain resource and the second frequency domain resource; and sending the uplink information according to the first frequency domain resource and the second frequency domain resource based on the cause for the connection request, wherein
the uplink information is configured for requesting connection resumption, connection establishment, or connection reestablishment,
the connection request is a connection resumption request, a connection establishment request, or a connection reestablishment request, and
the cause for the connection request includes the connection resumption request being triggered by a quality of service identifier having an index value associated with at least a first service type.

11. The method according to claim 10, wherein
the information related to the first frequency domain resource is information indicating the first frequency domain resource,
the information related to the second frequency domain resource is information indicating the second frequency domain resource, and
determining the first frequency domain resource and the second frequency domain resource based on the first information comprises:
determining the first frequency domain resource based on the information related to the first frequency domain resource; and
determining the second frequency domain resource based on the information related to the second frequency domain resource.

12. The method according to claim 10, wherein
the information related to the first frequency domain resource is information indicating the first frequency domain resource,
the information related to the second frequency domain resource is information indicating to obtain the second frequency domain resource based on the first frequency domain resource and with reference to a predefined or configured rule, and
determining the first frequency domain resource and the second frequency domain resource based on the first information comprises:
determining the first frequency domain resource based on the information related to the first frequency domain resource; and
determining the second frequency domain resource based on the information related to the first frequency domain resource, the information related to the second frequency domain resource, and the predefined or configured rule.

13. The method according to claim 10, wherein
the first frequency domain resource is used for initially transmitting the uplink information in a first hybrid automatic repeat request (HARQ) process, and the second frequency domain resource is configured for retransmitting the uplink information in the first HARQ process; or
the first frequency domain resource is used to initially transmit the uplink information in a first HARQ process, and the second frequency domain resource is used to initially transmit the uplink information in a second HARQ process.

14. A non-transitory computer readable medium configured to store computer readable instructions that, when executed by a processor, cause the processor to provide execution comprising:

receiving first information from a network device, wherein
the first information comprises information related to a first frequency domain resource and information related to a second frequency domain resource;
determining the first frequency domain resource and the second frequency domain resource based on the first information, wherein
the first information is carried in a connection release message, a broadcast message, or physical random access channel configuration information;
determining, based on a cause for a connection request, whether to send uplink information by using the first frequency domain resource and the second frequency domain resource; and
sending the uplink information according to the first frequency domain resource and the second frequency domain resource based on the cause for the connection request, wherein
the uplink information is used to request connection resumption, connection establishment, or connection reestablishment,
the connection request is a connection resumption request, a connection establishment request, or a connection reestablishment request, and
the cause for the connection request includes the connection resumption request being triggered by a quality of service identifier having an index value associated with at least a first service type.

15. The non-transitory computer readable medium according to claim 14, wherein
the information related to the first frequency domain resource is information indicating the first frequency domain resource;
the information related to the second frequency domain resource is information indicating the second frequency domain resource, and
determining the first frequency domain resource and the second frequency domain resource based on the first information comprises:
determining the first frequency domain resource based on the information related to the first frequency domain resource; and
determining the second frequency domain resource based on the information related to the second frequency domain resource.

16. The non-transitory computer readable medium according to claim 14, wherein
the information related to the first frequency domain resource is information indicating the first frequency domain resource;
the information related to the second frequency domain resource is information indicating to obtain the second frequency domain resource based on the first frequency domain resource and with reference to a predefined or configured rule, and
determining the first frequency domain resource and the second frequency domain resource based on the first information comprises:
determining the first frequency domain resource based on the information related to the first frequency domain resource; and
determining the second frequency domain resource based on the information related to the first frequency domain resource, the information related to the second frequency domain resource, and the predefined or configured rule.

* * * * *